US012259156B2

(12) United States Patent
Avedon

(10) Patent No.: US 12,259,156 B2
(45) **Date of Patent: *Mar. 25, 2025**

(54) AIR MOVING DEVICE WITH BYPASS INTAKE

(71) Applicant: AIRIUS IP HOLDINGS, LLC, Longmont, CO (US)

(72) Inventor: Raymond B. Avedon, Boulder, CO (US)

(73) Assignee: Airius IP Holdings, LLC, Longmont, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/459,224

(22) Filed: Aug. 31, 2023

(65) Prior Publication Data

US 2024/0003559 A1 Jan. 4, 2024

Related U.S. Application Data

(63) Continuation of application No. 18/173,440, filed on Feb. 23, 2023, now Pat. No. 11,781,761, which is a (Continued)

(51) Int. Cl.
*F24F 7/007* (2006.01)
*F04D 19/00* (2006.01)
(Continued)

(52) U.S. Cl.
CPC ............ *F24F 7/007* (2013.01); *F04D 19/002* (2013.01); *F04D 25/088* (2013.01);
(Continued)

(58) Field of Classification Search
CPC .... F04D 19/002; F04D 25/088; F04D 29/541; F04D 29/542; F04D 29/544;
(Continued)

(56) References Cited

U.S. PATENT DOCUMENTS 651,637 A 6/1900 Nicol
D33,522 S 11/1900 Brinkerhoff
(Continued)

FOREIGN PATENT DOCUMENTS

AU 2013203632 11/2016
CN 1426729 7/2003
(Continued)

OTHER PUBLICATIONS

Keeler Hardware, "OC Oval Cylinder Escutcheon", https://keelerhardware.com.au/products/oc-oval-cylinder-escutcheon as printed Nov. 13, 2017 in 3 pages.
(Continued)

*Primary Examiner* — Christopher Verdier
(74) *Attorney, Agent, or Firm* — Knobbe, Martens, Olson & Bear, LLP

(57) ABSTRACT

An air moving device has a housing with a primary flow path and a secondary flow path that extends from a secondary inlet of the housing and empties into an inner outlet adjacent the primary flow path. An impeller assembly rotates a blade to cause air to enter the housing and flow along the primary flow path. The flow of air through the primary flow path creates a low pressure region at the inner outlet of the secondary flow path, causing air to flow through the secondary flow path and mix with the air in the primary flow path. The mixture of air flows through a downstream portion of the primary flow path having an expanded width compared to an upstream portion of the primary flow path and exits the housing. Stator vanes may extend longitudinally within the housing to cause columnar air flow. The device may be used for destratification of thermal gradients of air within an enclosure, such as a home or warehouse.

15 Claims, 15 Drawing Sheets

Related U.S. Application Data continuation of application No. 16/849,768, filed on Apr. 15, 2020, now Pat. No. 11,598,539.

(60) Provisional application No. 62/876,514, filed on Jul. 19, 2019, provisional application No. 62/835,314, filed on Apr. 17, 2019.

(51) Int. Cl.
*F04D 25/08* (2006.01)
*F04D 27/00* (2006.01)
*F04D 27/02* (2006.01)
*F04D 29/54* (2006.01)
*F04D 29/68* (2006.01)
*F04F 5/16* (2006.01)
*F24F 7/06* (2006.01)

(52) U.S. Cl.
CPC ....... *F04D 27/007* (2013.01); *F04D 27/0215* (2013.01); *F04D 29/541* (2013.01); *F04D 29/542* (2013.01); *F04D 29/544* (2013.01); *F04D 29/547* (2013.01); *F04D 29/684* (2013.01); *F04F 5/16* (2013.01); *F24F 7/065* (2013.01); *F05B 2240/12* (2013.01); *F05B 2250/501* (2013.01)

(58) Field of Classification Search
CPC .. F04D 29/547; F04D 27/007; F04D 27/0215; F04D 29/684; F04F 5/16; F24F 7/007; F24F 7/06; F24F 7/065
See application file for complete search history.

(56) References Cited

U.S. PATENT DOCUMENTS 818,604 A 4/1906 Bierd
866,292 A 9/1907 Meston
917,206 A 4/1909 Watts
1,053,025 A 2/1913 Goodwin
1,858,067 A 5/1932 Warren
1,877,347 A 9/1932 McCurdie
1,926,795 A 9/1933 Sassenberg
2,016,778 A 10/1935 Hall et al.
2,142,307 A 1/1939 Mey et al.
2,144,035 A 1/1939 Smith, Jr.
2,154,313 A 4/1939 McMahan
2,189,008 A 2/1940 Kurth
2,189,502 A 2/1940 Johnston
2,232,573 A 2/1941 Teves
2,258,731 A 10/1941 Blumenthal
D133,120 S 7/1942 Spear
2,300,574 A 11/1942 Jepertinger
2,359,021 A 9/1944 Campbell et al.
2,366,773 A 1/1945 Eklund et al.
2,371,821 A 3/1945 Havis
D152,397 S 1/1949 Damond
2,513,463 A 7/1950 Eklund et al.
2,524,974 A 10/1950 Hickmott
2,615,620 A 10/1952 Goettl
2,632,375 A 3/1953 Stair et al.
2,658,719 A 11/1953 Johanson
D174,230 S 3/1955 Lewis, II
2,710,337 A 6/1955 Moore, Jr.
2,814,433 A 11/1957 Brinen
2,830,523 A 4/1958 Vehige
D187,699 S 4/1960 Rijn
2,982,198 A 5/1961 Mohrman
3,012,494 A 12/1961 Drummond
3,036,509 A 5/1962 Babbitt
3,040,993 A 6/1962 Schultz
3,068,341 A 12/1962 Ortiz et al.
3,072,321 A 1/1963 King, Jr.
D195,287 S 5/1963 Downing
3,099,949 A 8/1963 Davidson
3,165,294 A 1/1965 Anderson
3,188,007 A 6/1965 Myklebust
3,212,425 A 10/1965 Lindner et al.
3,246,699 A 4/1966 Jocz
3,300,123 A 1/1967 Freyholdt et al.
3,306,179 A 2/1967 Lambie et al.
3,320,869 A 5/1967 Schach
3,364,839 A 1/1968 Sweeney et al.
3,382,791 A 5/1968 Henry-Biabaud
3,386,368 A 6/1968 Fielding
3,413,905 A 12/1968 Johnson
3,524,399 A 8/1970 Bohanon
3,584,968 A 6/1971 Keith
3,601,184 A 8/1971 Hauville
3,690,244 A 9/1972 Kallel et al.
3,699,872 A 10/1972 Kruger
3,765,317 A 10/1973 Lowe
3,785,271 A 1/1974 Joy
3,827,342 A 8/1974 Hughes
D232,831 S 9/1974 Vidmar, Jr.
3,835,759 A 9/1974 LLoyd
D234,847 S 4/1975 Hoffman
3,876,331 A 4/1975 DenHerder et al.
3,927,300 A 12/1975 Wada et al.
3,932,054 A 1/1976 McKelvey
3,934,494 A 1/1976 Butler
3,967,927 A 7/1976 Patterson
3,973,479 A 8/1976 Whiteley
3,988,973 A 11/1976 Honmann
4,006,673 A 2/1977 Meyer et al.
D246,467 S 11/1977 Kurata
4,064,427 A 12/1977 Hansen et al.
4,123,197 A 10/1978 Keem et al.
D251,851 S 5/1979 Palm
4,152,973 A 5/1979 Peterson
4,162,779 A 7/1979 Van Steenhoven et al.
4,185,545 A 1/1980 Rusth et al.
D255,488 S 6/1980 Kanarek
4,210,833 A 7/1980 Neveux
D256,273 S 8/1980 Townsend et al.
4,234,916 A 11/1980 Goralnik
D258,010 S 1/1981 Bowls et al.
D258,526 S 3/1981 Nederman
4,261,255 A 4/1981 Anderson et al.
4,321,659 A 3/1982 Wheeler
4,344,112 A 8/1982 Brown
D269,638 S 7/1983 Frye, Jr. et al.
4,391,570 A 7/1983 Stutzman
4,396,352 A 8/1983 Pearce
D272,184 S 1/1984 Karpowicz
D273,793 S 5/1984 Nachatelo
D274,772 S 7/1984 Obland
4,473,000 A 9/1984 Perkins
4,512,242 A 4/1985 Bohanon, Sr.
4,515,538 A 5/1985 Shih
4,522,255 A 6/1985 Baker
4,524,679 A 6/1985 Lyons
4,546,420 A 10/1985 Wheeler et al.
4,548,548 A 10/1985 Gray, III
4,550,649 A 11/1985 Zambolin
D283,054 S 3/1986 Altman
4,630,182 A 12/1986 Moroi et al.
4,657,483 A 4/1987 Bede
4,657,485 A 4/1987 Hartwig
4,662,912 A 5/1987 Perkins
4,678,410 A 7/1987 Kullen
4,681,024 A 7/1987 Ivey
D291,488 S 8/1987 Delmas
4,692,091 A 9/1987 Ritenour
D293,029 S 12/1987 Shwisha
4,714,230 A 12/1987 Huang
4,715,784 A 12/1987 Mosiewicz
4,716,818 A 1/1988 Brown
4,730,551 A 3/1988 Peludat
4,750,863 A 6/1988 Scoggins
4,790,863 A 12/1988 Nobiraki et al.
4,794,851 A 1/1989 Kurrle
4,796,343 A 1/1989 Wing
4,848,669 A 7/1989 George

(56) References Cited

U.S. PATENT DOCUMENTS

| | | | |
|---|---|---|---|
| 4,850,265 | A | 7/1989 | Raisanen |
| 4,890,547 | A | 1/1990 | Wagner et al. |
| 4,895,065 | A | 1/1990 | Lamparter |
| D308,416 | S | 6/1990 | Brumbach |
| 4,930,987 | A | 6/1990 | Stahl |
| 4,971,143 | A | 11/1990 | Hogan |
| 4,973,016 | A | 11/1990 | Hertenstein |
| D312,875 | S | 12/1990 | Spock |
| D314,619 | S | 2/1991 | Beavers et al. |
| 5,000,081 | A | 3/1991 | Gilmer |
| 5,021,932 | A | 6/1991 | Ivey |
| 5,033,711 | A | 7/1991 | Gregorich et al. |
| 5,042,366 | A | 8/1991 | Panetski et al. |
| 5,060,901 | A | 10/1991 | Lathrop et al. |
| 5,078,574 | A | 1/1992 | Olsen |
| 5,094,676 | A | 3/1992 | Karbacher |
| D325,628 | S | 4/1992 | Cho |
| 5,107,755 | A | 4/1992 | Leban et al. |
| 5,121,675 | A | 6/1992 | Muller et al. |
| 5,127,876 | A | 7/1992 | Howe et al. |
| D328,405 | S | 8/1992 | Heiligenstein et al. |
| 5,152,606 | A | 10/1992 | Borraccia et al. |
| 5,156,568 | A | 10/1992 | Ricci |
| 5,191,618 | A | 3/1993 | Hisey |
| D335,532 | S | 5/1993 | Lopez |
| D337,157 | S | 7/1993 | Ortiz |
| D340,765 | S | 10/1993 | Joss et al. |
| 5,251,461 | A | 10/1993 | Fallows, III et al. |
| D347,467 | S | 5/1994 | Medvick |
| 5,328,152 | A | 7/1994 | Castle |
| 5,358,443 | A | 10/1994 | Mitchell et al. |
| 5,399,119 | A | 3/1995 | Birk et al. |
| 5,423,660 | A | 6/1995 | Sortor |
| 5,429,481 | A | 7/1995 | Liu |
| 5,439,349 | A | 8/1995 | Kupferberg |
| 5,439,352 | A | 8/1995 | Line |
| 5,443,625 | A | 8/1995 | Schaffhausen |
| 5,458,505 | A | 10/1995 | Prager |
| 5,462,484 | A | 10/1995 | Jung et al. |
| 5,466,120 | A | 11/1995 | Takeuchi et al. |
| 5,484,076 | A | 1/1996 | Petrushka |
| 5,511,942 | A | 4/1996 | Meier |
| 5,513,953 | A | 5/1996 | Hansen |
| 5,520,515 | A | 5/1996 | Bailey et al. |
| 5,545,241 | A | 8/1996 | Vanderauwera et al. |
| 5,547,343 | A | 8/1996 | Janéet al. |
| 5,551,841 | A | 9/1996 | Kamada |
| 5,561,952 | A | 10/1996 | Damron |
| 5,569,019 | A | 10/1996 | Katariya et al. |
| 5,584,656 | A | 12/1996 | Rose |
| 5,595,068 | A | 1/1997 | Amr |
| 5,613,833 | A | 3/1997 | Wolfe et al. |
| 5,658,196 | A | 8/1997 | Swaim |
| 5,664,872 | A | 9/1997 | Spearman et al. |
| D386,267 | S | 11/1997 | Tickner |
| 5,709,458 | A | 1/1998 | Metz |
| 5,725,190 | A | 3/1998 | Cuthbertson et al. |
| 5,725,356 | A | 3/1998 | Carter |
| 5,782,438 | A | 7/1998 | Hubben et al. |
| 5,791,985 | A | 8/1998 | Schiedegger et al. |
| 5,822,186 | A | 10/1998 | Bull |
| D404,617 | S | 1/1999 | Mick et al. |
| D407,696 | S | 4/1999 | Shimazu |
| 5,918,972 | A | 7/1999 | Van Belle |
| 5,934,783 | A | 8/1999 | Yoshikawa |
| 5,938,527 | A | 8/1999 | Oshima et al. |
| D414,550 | S | 9/1999 | Bloom |
| 5,947,816 | A | 9/1999 | Schiedegger et al. |
| 5,967,891 | A | 10/1999 | Riley et al. |
| 5,975,853 | A | 11/1999 | Lackey |
| 5,984,252 | A | 11/1999 | Bograng et al. |
| 5,997,253 | A | 12/1999 | Fechan |
| 6,004,097 | A | 12/1999 | Wark et al. |
| 6,068,385 | A | 5/2000 | Hsieh |
| D427,673 | S | 7/2000 | Stout, Jr. |
| 6,095,671 | A | 8/2000 | Hutain |
| 6,109,874 | A | 8/2000 | Steiner |
| 6,145,798 | A | 11/2000 | Janisse et al. |
| 6,149,513 | A | 11/2000 | Lyu |
| 6,155,782 | A | 12/2000 | Hsu |
| 6,168,517 | B1 | 1/2001 | Cook |
| 6,176,680 | B1 | 1/2001 | Ringblom et al. |
| 6,183,203 | B1 | 2/2001 | Grintz |
| 6,192,702 | B1 | 2/2001 | Shimogori |
| 6,193,384 | B1 | 2/2001 | Stein |
| 6,196,915 | B1 | 3/2001 | Schiedegger et al. |
| D443,053 | S | 5/2001 | Schaefer |
| 6,319,304 | B1 | 11/2001 | Moredock |
| D453,960 | S | 2/2002 | Shelby et al. |
| 6,352,473 | B1 | 3/2002 | Clark |
| 6,357,714 | B1 | 3/2002 | Johnson |
| 6,360,816 | B1 | 3/2002 | Wagner |
| 6,361,428 | B1 | 3/2002 | Tosconi et al. |
| 6,361,431 | B1 | 3/2002 | Kawano |
| 6,364,760 | B1 | 4/2002 | Rooney |
| D457,142 | S | 5/2002 | Chang |
| D457,452 | S | 5/2002 | Christiansen |
| D457,613 | S | 5/2002 | Schaefer |
| 6,382,911 | B1 | 5/2002 | Beltowski |
| 6,383,072 | B2 | 5/2002 | Schiedegger et al. |
| 6,384,494 | B1 | 5/2002 | Avidano et al. |
| 6,386,828 | B1 | 5/2002 | Davis et al. |
| 6,386,970 | B1 | 5/2002 | Vernier, II et al. |
| 6,386,972 | B1 | 5/2002 | Schiedegger et al. |
| 6,435,964 | B1 | 8/2002 | Chang |
| 6,451,080 | B1 | 9/2002 | Rocklitz et al. |
| 6,458,028 | B2 | 10/2002 | Snyder |
| 6,458,628 | B1 | 10/2002 | Distefano et al. |
| 6,484,524 | B1 | 11/2002 | Ulanov |
| D470,066 | S | 2/2003 | Christiansen |
| D470,731 | S | 2/2003 | Hipgrave et al. |
| 6,551,185 | B1 | 4/2003 | Miyake et al. |
| 6,575,011 | B1 | 6/2003 | Busby et al. |
| 6,581,974 | B1 | 6/2003 | Ragner et al. |
| 6,582,291 | B2 | 6/2003 | Clark |
| 6,592,328 | B1 | 7/2003 | Cahill |
| 6,595,747 | B2 | 7/2003 | Bos |
| D480,132 | S | 9/2003 | Stout, Jr. |
| 6,626,003 | B1 | 9/2003 | Kortüm et al. |
| 6,626,636 | B2 | 9/2003 | Bohn |
| D481,101 | S | 10/2003 | Boehrs et al. |
| D481,127 | S | 10/2003 | Hayamizu |
| D481,159 | S | 10/2003 | Walker |
| 6,648,752 | B2 | 11/2003 | Vernier, II et al. |
| 6,679,433 | B2 | 1/2004 | Gordon et al. |
| 6,682,308 | B1 | 1/2004 | Fei et al. |
| 6,700,266 | B2 | 3/2004 | Winkel et al. |
| D489,967 | S | 5/2004 | Funk |
| 6,761,531 | B2 | 7/2004 | Toye |
| 6,767,281 | B2 | 7/2004 | McKee |
| 6,783,578 | B2 | 8/2004 | Tillman, Jr. |
| 6,804,627 | B1 | 10/2004 | Marokhovsky et al. |
| 6,805,627 | B2 | 10/2004 | Marts et al. |
| 6,812,849 | B1 | 11/2004 | Ancel |
| D500,773 | S | 1/2005 | Colson et al. |
| D505,627 | S | 5/2005 | Py et al. |
| 6,886,270 | B2 | 5/2005 | Gilmer |
| 6,916,240 | B1 | 7/2005 | Morton |
| 6,938,631 | B2 | 9/2005 | Gridley |
| 6,941,698 | B2 | 9/2005 | Telles |
| 6,951,081 | B2 | 10/2005 | Bonshor |
| 6,966,830 | B2 | 11/2005 | Hurlstone et al. |
| 6,974,381 | B1 | 12/2005 | Walker et al. |
| D514,688 | S | 2/2006 | Avedon |
| 7,011,500 | B2 | 3/2006 | Matson |
| 7,011,578 | B1 | 3/2006 | Core |
| 7,044,849 | B2 | 5/2006 | Dippel |
| 7,048,499 | B2 | 5/2006 | Mathson et al. |
| 7,056,092 | B2 | 6/2006 | Stahl |
| 7,056,368 | B2 | 6/2006 | Moredock et al. |
| D525,725 | S | 7/2006 | Foo |
| 7,101,064 | B2 | 9/2006 | Ancel |
| D532,229 | S | 11/2006 | Hoernig et al. |
| 7,152,425 | B2 | 12/2006 | Han et al. |

(56) References Cited

U.S. PATENT DOCUMENTS 7,166,023 B2 1/2007 Haigh et al.
7,175,309 B2 2/2007 Craw et al.
7,185,504 B2 3/2007 Kasai et al.
7,201,110 B1 4/2007 Pawlak
7,201,650 B2 4/2007 Demerath et al.
7,214,035 B2 5/2007 Bussieres et al.
7,246,997 B2 7/2007 Liu et al.
D552,485 S 10/2007 Grabiner et al.
7,287,738 B2 10/2007 Pitlor
7,288,023 B2 10/2007 Leopold
D557,791 S 12/2007 Cox
7,311,492 B2 12/2007 Östberg
7,320,636 B2 1/2008 Seliger et al.
7,331,764 B1 2/2008 Reynolds et al.
D564,120 S 3/2008 Layne et al.
D567,930 S 4/2008 Smith
D567,961 S 4/2008 Yajima
7,374,408 B2 5/2008 Savage et al.
D570,981 S 6/2008 McClelland
7,381,129 B2 6/2008 Avedon
D578,390 S 10/2008 Green
D582,502 S 12/2008 Brittingham
D583,451 S 12/2008 Aloe et al.
D583,452 S 12/2008 Aloe et al.
7,467,931 B2 12/2008 O'Toole
D584,786 S 1/2009 Brittingham
7,473,074 B2 1/2009 Herbst et al.
7,476,079 B2 1/2009 Bartlett
7,484,863 B1 2/2009 Aubrey
7,497,773 B1 3/2009 Schmidt
D591,382 S 4/2009 Brittingham
7,516,578 B2 4/2009 Bonshor
7,544,124 B2 6/2009 Polston
7,549,258 B2 6/2009 Lajewski
7,566,034 B2 7/2009 Bonshor
D599,471 S 9/2009 Borovicka et al.
D600,396 S 9/2009 Luinstra
7,607,935 B2 10/2009 Dahl
D604,880 S 11/2009 Lovegrove
7,610,717 B2 11/2009 Lüken et al.
7,610,726 B2 11/2009 Lajewski
D605,332 S 12/2009 Miranda
7,645,188 B1 1/2010 Peerbolt
7,651,390 B1 1/2010 Profeta et al.
D612,925 S 3/2010 Kameyama et al.
7,677,770 B2 3/2010 Mazzochette
7,677,964 B1 3/2010 Bucher et al.
7,708,625 B2 5/2010 Leseman et al.
7,717,674 B2 5/2010 Tsuji et al.
D617,890 S 6/2010 Thomas
D620,096 S 7/2010 Underwood
7,748,954 B2 7/2010 Eguchi et al.
7,752,814 B2 7/2010 Bonshor
D621,985 S 8/2010 Sanoner
D622,895 S 8/2010 Lyons
7,774,999 B2 8/2010 McKee
7,780,510 B2 8/2010 Polston
7,785,064 B2 8/2010 Bartholmey et al.
D625,855 S 10/2010 Franklin
D625,856 S 10/2010 Franklin
7,849,644 B2 12/2010 Melesky
D630,337 S 1/2011 Chia et al.
D630,536 S 1/2011 Pettit
D631,142 S 1/2011 Angell
D631,148 S 1/2011 Benton et al.
D631,579 S 1/2011 Franklin
D631,580 S 1/2011 Franklin
D631,581 S 1/2011 Franklin
7,901,278 B2 3/2011 O'Hagin
7,930,858 B2 4/2011 Lajewski
7,942,627 B2 5/2011 Jin
D645,550 S 9/2011 Ferroni
D645,561 S 9/2011 Herrmann et al.
D645,593 S 9/2011 Janssen
8,052,386 B1 11/2011 Fitzpatrick et al.
D651,709 S 1/2012 Zeyfang
D651,919 S 1/2012 Lai et al.
D651,920 S 1/2012 Lai et al.
D661,902 S 6/2012 Italiano
8,215,789 B2 7/2012 Howard
8,282,138 B2 10/2012 Steiner
8,297,945 B2 10/2012 Spaggiari
D672,863 S 12/2012 Romero Carreras
D676,877 S 2/2013 Drenth et al.
8,366,387 B2 2/2013 Reuter
D678,791 S 3/2013 Ford
D681,184 S 4/2013 Romero Carreras
D684,307 S 6/2013 Teller
8,459,846 B2 6/2013 Tsao
8,487,517 B2 7/2013 Fang et al.
8,529,324 B2 9/2013 Moredock et al.
8,535,128 B2 9/2013 Chwala
8,596,596 B2 12/2013 Naji et al.
8,616,842 B2 12/2013 Avedon
D698,916 S 2/2014 Avedon
8,641,375 B2 2/2014 Tian et al.
D702,887 S 4/2014 Peiruccelli
D703,302 S 4/2014 Ruck
D703,579 S 4/2014 Kuster et al.
D709,643 S 7/2014 Kohler et al.
D710,485 S 8/2014 Nudo
D710,490 S 8/2014 Shurtleff
D711,843 S 8/2014 Yamazaki et al.
D714,996 S 10/2014 Trotter et al.
D715,904 S 10/2014 Tate et al.
8,894,354 B2 11/2014 Hodgson et al.
8,899,930 B2 12/2014 Innocenti et al.
D721,645 S 1/2015 Brown
8,931,936 B1 1/2015 Tham et al.
D722,486 S 2/2015 Wang
D724,199 S 3/2015 Bambot et al.
D725,053 S 3/2015 Kaneko et al.
D725,055 S 3/2015 Yamazaki et al.
8,967,983 B2 3/2015 Kampf
8,992,174 B2 3/2015 Chang
D730,185 S 5/2015 Blanco et al.
9,028,085 B2 5/2015 Todd, Jr.
9,028,211 B2 5/2015 Todd, Jr.
D731,030 S 6/2015 Tyler
D733,555 S 7/2015 Brady et al.
D739,223 S 9/2015 Paik et al.
D739,515 S 9/2015 Johnson et al.
D739,832 S 9/2015 Yamazaki et al.
D740,973 S 10/2015 Gonzalez
9,151,295 B2 10/2015 Avedon
D742,508 S 11/2015 Row et al.
D742,563 S 11/2015 Kasha
D743,521 S 11/2015 Jackson
D746,416 S 12/2015 Barlar
D746,971 S 1/2016 Avedon
D747,453 S 1/2016 Stewart et al.
D752,339 S 3/2016 Hoover
D753,817 S 4/2016 Maguire et al.
D753,818 S 4/2016 Maguire et al.
D754,312 S 4/2016 Ellis
D755,438 S 5/2016 Kimmet
D756,494 S 5/2016 Gledhill et al.
D756,498 S 5/2016 Norman et al.
9,335,061 B2 5/2016 Avedon
D758,642 S 6/2016 Eguchi
D760,384 S 6/2016 Niunoya et al.
D761,419 S 7/2016 Fitzgerald et al.
D766,098 S 9/2016 Seo
D766,100 S 9/2016 Jung
D768,844 S 10/2016 Koseoglu
9,459,020 B2 10/2016 Avedon
D772,531 S 11/2016 Troia
D774,689 S 12/2016 Terumichi
D775,719 S 1/2017 Smith et al.
D777,311 S 1/2017 Chen
D783,795 S 4/2017 Avedon
9,631,627 B2 4/2017 Avedon
D788,886 S 6/2017 Salzer
D788,953 S 6/2017 Khan

(56) References Cited

U.S. PATENT DOCUMENTS

| | | | |
|---|---|---|---|
| 9,696,026 B1 | 7/2017 | Hardgrave | |
| 9,702,576 B2 | 7/2017 | Avedon | |
| 9,714,663 B1 | 7/2017 | Avedon | |
| D794,198 S | 8/2017 | Mizumura et al. | |
| D794,199 S | 8/2017 | Mizumura et al. | |
| D798,718 S | 10/2017 | Foster et al. | |
| D799,014 S | 10/2017 | Suarez et al. | |
| D799,675 S | 10/2017 | Wong | |
| D800,174 S | 10/2017 | Ghalsasi et al. | |
| D801,510 S | 10/2017 | O'Connett et al. | |
| D801,545 S | 10/2017 | Wiesli et al. | |
| D803,381 S | 11/2017 | Kim et al. | |
| D805,176 S | 12/2017 | Avedon | |
| D818,185 S | 5/2018 | Wilson | |
| 9,970,457 B2 | 5/2018 | Avedon | |
| D820,967 S | 6/2018 | Avedon | |
| 10,024,531 B2 | 7/2018 | Avedon | |
| D824,716 S | 8/2018 | Elgamil et al. | |
| D825,090 S | 8/2018 | Richardson et al. | |
| D831,484 S | 10/2018 | Jung et al. | |
| D835,265 S | 12/2018 | Inoue | |
| D836,238 S | 12/2018 | Ericson, Jr. et al. | |
| D838,379 S | 1/2019 | Trump | |
| 10,184,489 B2 | 1/2019 | Avedon | |
| D840,009 S | 2/2019 | Suarez et al. | |
| D841,452 S | 2/2019 | Conselvan | |
| D844,126 S | 3/2019 | Sheng et al. | |
| D844,128 S | 3/2019 | Li | |
| 10,221,861 B2 | 3/2019 | Avedon | |
| D845,461 S | 4/2019 | Li | |
| D845,462 S | 4/2019 | Li | |
| D847,967 S | 5/2019 | Hernández et al. | |
| D848,295 S | 5/2019 | Johnson et al. | |
| D850,727 S | 6/2019 | Petruccelli | |
| D852,143 S | 6/2019 | Ku | |
| D853,017 S | 7/2019 | Rioux et al. | |
| D861,979 S | 10/2019 | Sibley | |
| D862,795 S | 10/2019 | Caldas | |
| D865,223 S | 10/2019 | Spork et al. | |
| D865,907 S | 11/2019 | Wagner | |
| D868,254 S | 11/2019 | Lintula et al. | |
| 10,487,840 B2 | 11/2019 | Avedon | |
| 10,487,852 B2 | 11/2019 | Avedon | |
| D869,275 S | 12/2019 | Taunk | |
| D870,778 S | 12/2019 | Johnson | |
| D871,535 S | 12/2019 | Ferrer | |
| D872,911 S | 1/2020 | Chen | |
| D877,917 S | 3/2020 | Schill | |
| D880,098 S | 3/2020 | Harrison et al. | |
| D881,374 S | 4/2020 | Schoettle | |
| D885,550 S | 5/2020 | Avedon | |
| 10,641,506 B2 | 5/2020 | Avedon | |
| 10,655,841 B2 | 5/2020 | Avedon | |
| D886,275 S | 6/2020 | Avedon | |
| D887,541 S | 6/2020 | Avedon | |
| 10,724,542 B2 | 7/2020 | Avedon | |
| D895,784 S | 9/2020 | Wang | |
| 11,053,948 B2 | 7/2021 | Avedon | |
| D926,963 S | 8/2021 | Avedon | |
| 11,092,330 B2 | 8/2021 | Avedon | |
| 11,105,341 B2 | 8/2021 | Avedon | |
| 11,221,153 B2 | 1/2022 | Avedon | |
| 11,236,766 B2 | 2/2022 | Avedon | |
| D953,517 S | 5/2022 | Belozerova et al. | |
| 11,365,743 B2 | 6/2022 | Avedon | |
| 11,421,710 B2 | 8/2022 | Avedon | |
| 11,598,539 B2 | 3/2023 | Avedon | |
| D987,054 S | 5/2023 | Avedon | |
| 11,703,062 B2 | 7/2023 | Avedon | |
| 11,713,773 B2 | 8/2023 | Avedon | |
| 11,781,761 B1 * | 10/2023 | Avedon .................. | F24F 7/065 415/208.1 |
| 2001/0049927 A1 | 12/2001 | Toepel | |
| 2002/0045420 A1 | 4/2002 | Taillon | |
| 2002/0131865 A1 | 9/2002 | Larzelere et al. | |
| 2002/0137454 A1 | 9/2002 | Baker | |
| 2003/0026691 A1 | 2/2003 | Huang et al. | |
| 2003/0092373 A1 | 5/2003 | Kuo | |
| 2003/0213883 A1 | 11/2003 | Fu-Liang | |
| 2004/0004173 A1 | 1/2004 | Johnson | |
| 2004/0050077 A1 | 3/2004 | Kasai et al. | |
| 2004/0052641 A1 | 3/2004 | Chen | |
| 2004/0240214 A1 | 12/2004 | Whitlow et al. | |
| 2004/0253095 A1 | 12/2004 | Sasaki et al. | |
| 2005/0045793 A1 | 3/2005 | Johnson et al. | |
| 2005/0077446 A1 | 4/2005 | Bacon et al. | |
| 2005/0092888 A1 | 5/2005 | Gonce | |
| 2005/0159101 A1 | 7/2005 | Hrdina et al. | |
| 2006/0087810 A1 | 4/2006 | Rockenfeller | |
| 2006/0146542 A1 | 7/2006 | Sullivan | |
| 2006/0172688 A1 | 8/2006 | Johnson | |
| 2006/0193139 A1 | 8/2006 | Sun et al. | |
| 2006/0276123 A1 | 12/2006 | Sanagi et al. | |
| 2006/0278766 A1 | 12/2006 | Wang | |
| 2006/0284435 A1 | 12/2006 | Vitito | |
| 2007/0213003 A1 | 9/2007 | Railkar et al. | |
| 2007/0231145 A1 | 10/2007 | Jin | |
| 2007/0246579 A1 | 10/2007 | Blateri | |
| 2007/0297906 A1 | 12/2007 | Wu | |
| 2007/0297912 A1 | 12/2007 | Reuter | |
| 2008/0019836 A1 | 1/2008 | Butz et al. | |
| 2008/0061200 A1 | 3/2008 | Bouissiere | |
| 2008/0188175 A1 | 8/2008 | Wilkins | |
| 2008/0227381 A1 | 9/2008 | Avedon | |
| 2009/0041580 A1 | 2/2009 | Wichmann et al. | |
| 2009/0122516 A1 | 5/2009 | Yang | |
| 2009/0155080 A1 | 6/2009 | Yu | |
| 2009/0170421 A1 | 7/2009 | Adrian et al. | |
| 2009/0219727 A1 | 9/2009 | Weaver | |
| 2009/0262550 A1 | 10/2009 | Inoue | |
| 2010/0009621 A1 | 1/2010 | Hsieh | |
| 2010/0052495 A1 | 3/2010 | Liu et al. | |
| 2010/0075588 A1 | 3/2010 | Haneline | |
| 2010/0111698 A1 | 5/2010 | Wiedman et al. | |
| 2010/0176706 A1 | 7/2010 | Fu et al. | |
| 2010/0192611 A1 | 8/2010 | Yamaguchi et al. | |
| 2010/0202932 A1 | 8/2010 | Danville | |
| 2010/0232168 A1 | 9/2010 | Horng | |
| 2010/0266400 A1 | 10/2010 | Avedon | |
| 2010/0295436 A1 | 11/2010 | Horng et al. | |
| 2010/0328881 A1 | 12/2010 | Huang | |
| 2010/0329885 A1 | 12/2010 | Criner et al. | |
| 2011/0037368 A1 | 2/2011 | Huang | |
| 2011/0057551 A1 | 3/2011 | Lee et al. | |
| 2011/0057552 A1 | 3/2011 | Weaver | |
| 2011/0080096 A1 | 4/2011 | Dudik et al. | |
| 2011/0084586 A1 | 4/2011 | Lain et al. | |
| 2011/0133622 A1 | 6/2011 | Mo et al. | |
| 2011/0140588 A1 | 6/2011 | Chen | |
| 2011/0223016 A1 | 9/2011 | Ediger et al. | |
| 2011/0228967 A1 | 9/2011 | Kulchy et al. | |
| 2012/0060453 A1 | 3/2012 | Holzmann et al. | |
| 2012/0062095 A1 | 3/2012 | Horng | |
| 2012/0194054 A1 | 8/2012 | Johnston | |
| 2012/0195749 A1 | 8/2012 | Avedon | |
| 2013/0023195 A1 | 1/2013 | Avedon | |
| 2013/0111721 A1 | 5/2013 | Mahfoudh et al. | |
| 2013/0196588 A1 | 8/2013 | Liao | |
| 2014/0314560 A1 | 10/2014 | Avedon | |
| 2014/0348634 A1 | 11/2014 | Bourrilhon et al. | |
| 2015/0021013 A1 | 1/2015 | Batarseh | |
| 2016/0107200 A1 | 4/2016 | Al-Shafei et al. | |
| 2016/0146222 A1 | 5/2016 | Avedon | |
| 2018/0335049 A1 | 11/2018 | Gu et al. | |
| 2019/0010961 A1 | 1/2019 | Kumaou | |
| 2020/0166053 A1 | 5/2020 | Avedon | |
| 2020/0217530 A1 | 7/2020 | Avedon | |
| 2020/0232470 A1 | 7/2020 | Avedon | |
| 2021/0007449 A1 | 1/2021 | Udagawa | |
| 2021/0040960 A1 | 2/2021 | Shih et al. | |
| 2021/0277914 A1 | 9/2021 | Lu et al. | |
| 2021/0396248 A1 | 12/2021 | Gao | |
| 2022/0042522 A1 | 2/2022 | Avedon | |
| 2022/0120469 A1 | 4/2022 | Doat et al. | |

(56) References Cited

U.S. PATENT DOCUMENTS

| | | | |
|---|---|---|---|
| 2022/0220975 A1 | 7/2022 | Avedon | |
| 2023/0055245 A1 | 2/2023 | Avedon | |
| 2024/0003354 A1 | 1/2024 | Avedon | |

FOREIGN PATENT DOCUMENTS

| | | |
|---|---|---|
| CN | 101592328 | 12/2009 |
| CN | 201560963 | 8/2010 |
| DE | 44 13 542 | 10/1995 |
| DE | 196 38 518 | 4/1998 |
| DE | 10 2008 044874 | 3/2010 |
| EP | 0 037 958 | 10/1981 |
| EP | 0 212 749 | 3/1987 |
| EP | 0 772 007 | 5/1997 |
| EP | 2 248 692 | 11/2010 |
| FR | 0 715 101 | 11/1931 |
| FR | 2 784 423 | 4/2000 |
| GB | 190617978 | 5/1907 |
| GB | 0 792 369 | 3/1958 |
| GB | 0 824 390 | 11/1959 |
| GB | 0 981 188 | 1/1965 |
| GB | 1 251 880 | 11/1971 |
| GB | 2 344 619 | 6/2000 |
| GB | 2 468 504 | 9/2010 |
| JP | 55-032965 | 3/1980 |
| JP | 61-502267 | 10/1986 |
| JP | 01-067548 | 3/1989 |
| JP | 07-167097 | 7/1995 |
| JP | 07-253231 | 10/1995 |
| JP | 08-219939 | 8/1996 |
| JP | 11-132543 | 5/1999 |
| JP | 2001-193979 | 7/2001 |
| JP | 2002-349489 | 12/2002 |
| JP | 2006-350237 | 12/2006 |
| JP | 2010-181124 | 8/2010 |
| KR | 20-0176664 | 4/2000 |
| KR | 2003-0025428 | 3/2003 |
| KR | 10-1255739 | 4/2013 |
| RU | 2400254 C2 | 9/2010 |
| TW | M337636 | 8/2008 |
| WO | WO 01/034983 | 5/2001 |
| WO | WO 03/040572 | 5/2003 |
| WO | WO 2005/091896 | 10/2005 |
| WO | WO 2006/078102 | 7/2006 |
| WO | WO 2008/062319 | 5/2008 |
| WO | WO 2010/046536 | 4/2010 |
| WO | WO 2010/114702 | 10/2010 |
| WO | WO 2011/067430 | 6/2011 |
| WO | WO 2012/174155 | 12/2012 |
| WO | WO 2012/174156 | 12/2012 |
| WO | WO 2015/187856 | 12/2015 |
| WO | WO 2016/081693 | 5/2016 |
| WO | WO 2020/214729 | 10/2020 |

OTHER PUBLICATIONS

"The New Airius Q50 EC", https://web.archive.org/web/20150721185407/http://airius.com.au/technical/specification-sheets/the-new-airius-g50-ec, as archived Jul. 21, 2015, p. 2.

"Airius Model R20 EC 'Eyeball' Data Sheet", <http://airius.com.au/products/new-retail-series-2/attachment/na_std_retailseries/> published Jun. 15, 2016 as printed May 23, 2017 in 1 page.

* cited by examiner

AIR MOVING DEVICE WITH BYPASS INTAKE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. For example, this application is a continuation of U.S. patent application Ser. No. 18/173,440, filed Feb. 23, 2023, now U.S. Pat. No. 11,781,761, and titled "Air Moving Device With Bypass Intake," which is a continuation of U.S. patent application Ser. No. 16/849,768, filed Apr. 15, 2020, now U.S. Pat. No. 11,598,539, and titled "Air Moving Device With Bypass Intake," which claims the benefit of priority to U.S. Provisional Application No. 62/835,314 filed Apr. 17, 2019, and titled "Air Moving Device With Bypass Intake," and to U.S. Provisional Application No. 62/876,514 filed Jul. 19, 2019, and titled "Air Moving Device With Bypass Intake," the entirety of each of which is incorporated herein by reference for all purposes and forms a part of this specification.

BACKGROUND

Field

The development is related to air moving devices, in particular to air moving devices having a bypass intake for introducing a second flow path of air into the device.

Description of the Related Art

Air moving devices may be used to move air within enclosures. The devices may be positioned at or near the ceiling of an enclosure to destratify thermal gradients in the air, such as to mix warmer upper air with cooler lower air. The devices require power to rotate a blade to generate a thrust with the moving air.

SUMMARY

The embodiments disclosed herein each have several aspects no single one of which is solely responsible for the development's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices and methods for air moving devices.

The following description includes non-limiting examples of some embodiments. For instance, other embodiments of the described systems, devices and methods may or may not include the features described herein. Moreover, described advantages and benefits may apply only to certain embodiments and should not be used to limit the disclosure.

An aspect of the invention is the recognition that existing solutions for air moving devices have high power requirements for a given thrust and/or generate a low thrust for a give power input. However, improvements of existing solutions for air moving devices would be desirable.

In one aspect, an air moving device comprises a housing, an impeller assembly, and a secondary flow path. The housing extends axially and has an upper portion and a lower portion. The impeller assembly is supported by the housing and is configured to rotate a blade to cause air to enter the housing through the upper portion and exit the housing through the lower portion. The upper portion has a primary inlet, an upper inner sidewall, and an upper outer sidewall. The upper inner sidewall extends from the primary inlet toward the lower portion to a lower inner edge, and the upper outer sidewall is located radially outward from the inner upper sidewall and extends from the primary inlet toward the lower portion to a lower outer edge. The inner sidewall defines an upper region of a primary flow path extending through the upper portion, with the upper region having a first width. The lower portion has a lower outer sidewall extending from an upper edge to a primary outlet. The lower outer sidewall is located toward the primary outlet from the outer sidewall of the upper portion, and the lower outer sidewall defines a lower region of the primary flow path extending through the lower portion, with the lower region having a second width that is greater than the first width. The secondary flow path extends from an annular secondary inlet of the housing to an annular inner outlet that is in fluid communication with the primary flow path. The annular secondary inlet is located between the lower outer edge of the upper outer sidewall and the upper edge of the lower outer sidewall. The annular inner outlet is located between the lower outer sidewall of the lower portion and the lower inner edge of the upper inner sidewall.

Various embodiments of the various aspects may be implemented. The upper inner sidewall of the upper portion may form a nozzle. An axial distance from the primary inlet to the lower outer edge of the lower outer sidewall may be greater than or equal to an axial height of the annular secondary inlet. The axial height of the annular secondary inlet may extend from the lower outer edge of the upper outer sidewall to the upper edge of the lower outer sidewall. The air moving device may further comprise a plurality of longitudinal stator vanes, with each vane extending from an upper curved portion of the vane located within the upper region of the primary flow path to a first bottom edge of the vane at the primary outlet located within the lower region of the primary flow path. The air moving device may further comprise a plurality of longitudinal ribs, with each rib extending between the upper inner sidewall and the upper outer sidewall along the secondary flow path to a second bottom edge of the rib located within the lower region of the primary flow path. The air moving device may further comprise a plurality of longitudinal stator vanes extending from within the upper region of the primary flow path to within the lower region of the primary flow path. The air moving device may further comprise a plurality of longitudinal ribs extending between the upper inner sidewall and the upper outer sidewall along the secondary flow path. The upper portion and the lower portion may be integral.

In another aspect, an air moving device comprises an annular housing, an impeller assembly, and a secondary flow path. The annular housing extends axially from a primary inlet to a primary outlet and defines a primary flow path from the primary inlet to the primary outlet. The impeller assembly is coupled with the housing and is configured to rotate a blade to cause air to enter the housing through the primary inlet, flow along the primary flow path, and exit the housing through the primary outlet. The secondary flow path extends from an annular secondary inlet to an inner outlet, with the annular secondary inlet defined by an annular outer sidewall of the housing and located toward the primary outlet from the primary inlet of the housing, and the inner outlet located adjacent the primary flow path within the housing.

Various embodiments of the various aspects may be implemented. An upper region of the primary flow path located closer to the primary inlet than to the primary outlet may have a first cross-sectional area, a lower region of the primary flow path located closer to the primary outlet than to the primary inlet may have a second cross-sectional area, and the first cross-sectional area may be less than the second cross-sectional area. An axial distance from the primary inlet to an upper edge of the annular secondary inlet may be greater than or equal to an axial height of the annular secondary inlet. An upper region of the primary flow path located closer to the primary inlet than to the primary outlet may define a first diameter, a lower region of the primary flow path located closer to the primary outlet than to the primary inlet may define a second diameter, and the first diameter may be less than the second diameter. The upper portion of the housing may form a nozzle. An axial distance from the primary inlet to an upper edge of the annular secondary inlet may be greater than or equal to an axial height of the annular secondary inlet. The air moving device may further comprise a plurality of longitudinal stator vanes extending within the primary flow path. The air moving device may further comprise a plurality of longitudinal ribs extending within the secondary flow path. The air moving device may further comprise a plurality of longitudinal stator vanes extending within the primary flow path and that are radially aligned with the plurality of longitudinal ribs.

In various embodiments of the various aspects, an axial distance from the primary inlet to an upper edge of the annular secondary inlet may be greater than or equal to 80% of an axial height of the annular secondary inlet. The axial distance from the primary inlet to the upper edge of the annular secondary inlet may be greater than the axial height of the annular secondary inlet. The annular secondary inlet may extend an axial distance D2, the secondary flow path may have an axial portion with a radial width of distance D5, and D2 may be greater than or equal to 70% of D5. D2 may be 80% of D5. The air moving device may further comprise an upper inner sidewall that extends along an inner side of the secondary flow path to a lower edge, with the primary inlet located an axial distance D1 from an upper edge of the annular secondary inlet, the annular secondary inlet extending an axial distance D2, the lower edge of the upper inner sidewall located an axial distance D3 from the primary inlet, and where $D1+D2 \leq 1.1 \times D3$. In some embodiments $D1+D2 \leq D3$. An upper-most portion of the primary inlet may be located the axial distance D1 from the upper edge of the annular secondary inlet, and the lower edge of the upper inner sidewall may be located the axial distance D3 from the upper-most portion of the primary inlet. An upper-most portion of the blade may be located an axial distance D4 from the primary inlet, and D4 may be greater than or equal to 2 inches. The upper-most portion of the blade may be located the axial distance D4 from an upper-most portion of the primary inlet. The primary inlet may be located an axial height H from the primary outlet, the primary inlet has a radial opening equal to a width W1, and wherein H is at least 75% of W1. H may be greater than or equal to W1. H may be greater than $1.25 \times W1$.

In another aspect, an air moving device comprises a cowling, a lower sidewall, an impeller assembly, and a secondary flow path. The cowling defines a primary inlet and an upper region of a primary flow path having a first width. The lower sidewall is coupled with the cowling and defines a lower region of the primary flow path and a primary outlet. The lower region of the primary flow path has a second width that is greater than the first width. The impeller assembly is configured to rotate a blade to cause air to enter the primary inlet and exit the primary outlet. The secondary flow path extends from an annular secondary inlet to an inner outlet, with the annular secondary inlet defined by the cowling and the lower sidewall and located toward the primary outlet from the primary inlet, and the inner outlet located adjacent the primary flow path within the housing.

Various embodiments of the various aspects may be implemented. The cowling may form a nozzle. An axial distance from the primary inlet to an upper edge of the lower sidewall may be greater than or equal to an axial height of the annular secondary inlet. The air moving device may further comprise a plurality of longitudinal ribs extending within the secondary flow path to define a plurality of annular secondary inlets located between adjacent ribs.

In another aspect an air moving device comprises a housing and an impeller assembly. The housing has an upstream inlet, a downstream outlet, and defines a primary flow path extending through the housing from the inlet to the outlet. The housing further defines an annular secondary flow path extending from an annular opening of a sidewall of the housing to an annular downstream outlet of the secondary flow path that is adjacent the primary flow path within the housing. The impeller assembly is supported by the housing and configured to rotate a blade to cause air to enter the housing through the inlet, flow along the primary flow path, and exit the housing through the outlet.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawing, can be arranged, substituted, combined, and designed in a wide variety of different configurations, all of which are explicitly contemplated and make part of this disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following detailed description is directed to certain specific embodiments of the development. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments. Reference will now be made in detail to embodiments of the invention, examples of which are illustrated in the accompanying drawings. Wherever possible, the same reference numbers will be used throughout the drawings to refer to the same or like parts.

An air moving device is described having a housing with a primary flow path and a secondary flow path that extends from a secondary inlet of the housing and empties into an inner outlet adjacent the primary flow path. An impeller assembly rotates a blade to cause air to enter the housing and flow along the primary flow path. The flow of air through the primary flow path creates a low pressure region at the inner outlet of the secondary flow path, causing air to flow through the secondary flow path and mix with the air in the primary flow path. The mixture of air flows through a downstream portion of the primary flow path having an expanded cross-sectional area compared to an upstream portion of the primary flow path and exits the housing. Stator vanes may extend longitudinally within the housing to cause columnar air flow. The device may be used for destratification of thermal gradients of air within an enclosure, such as a home or warehouse.

Figure 1:
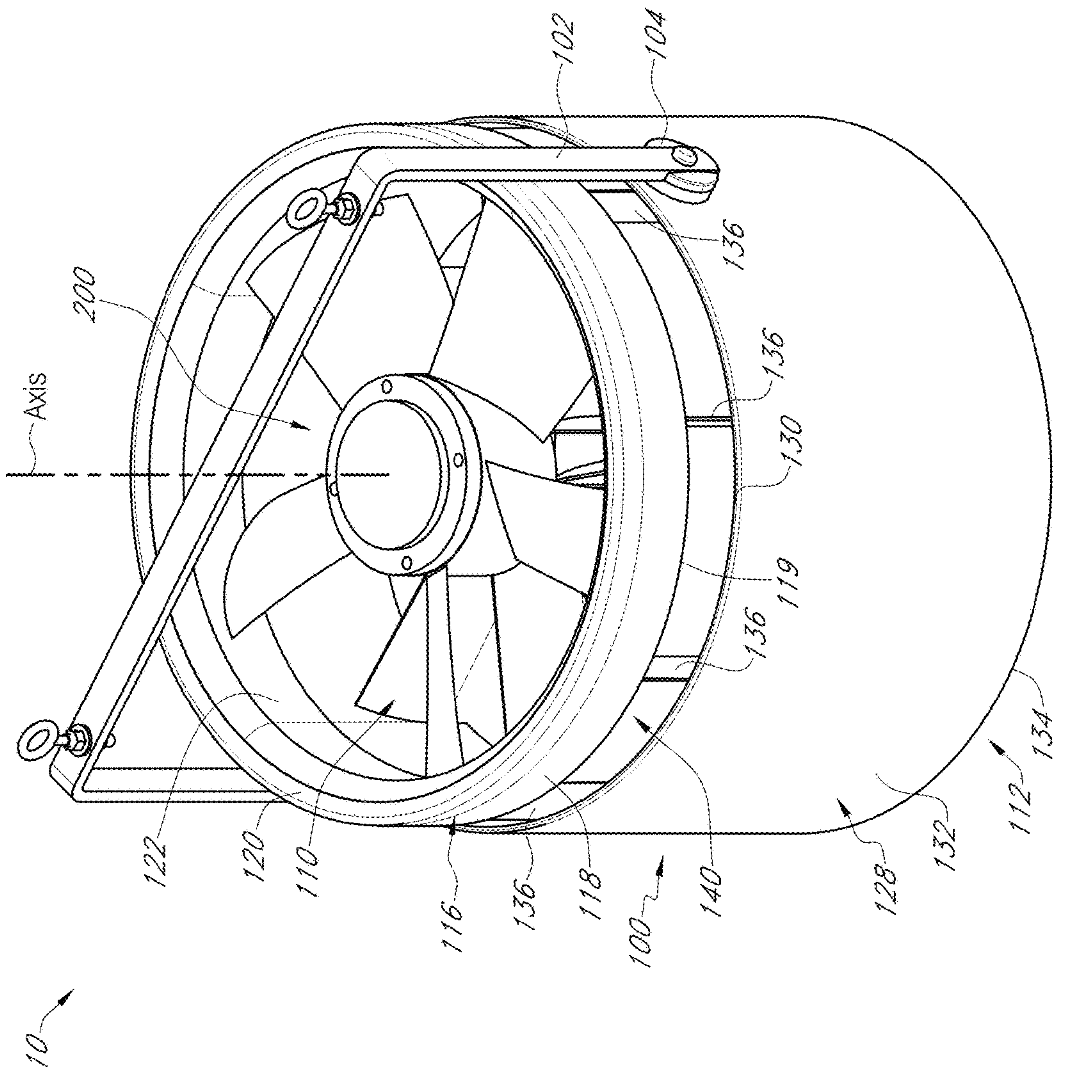
FIGS. 1 and 2 are top and bottom perspective views, respectively, of an embodiment of an air moving device having a bypass intake.
Figure 2:
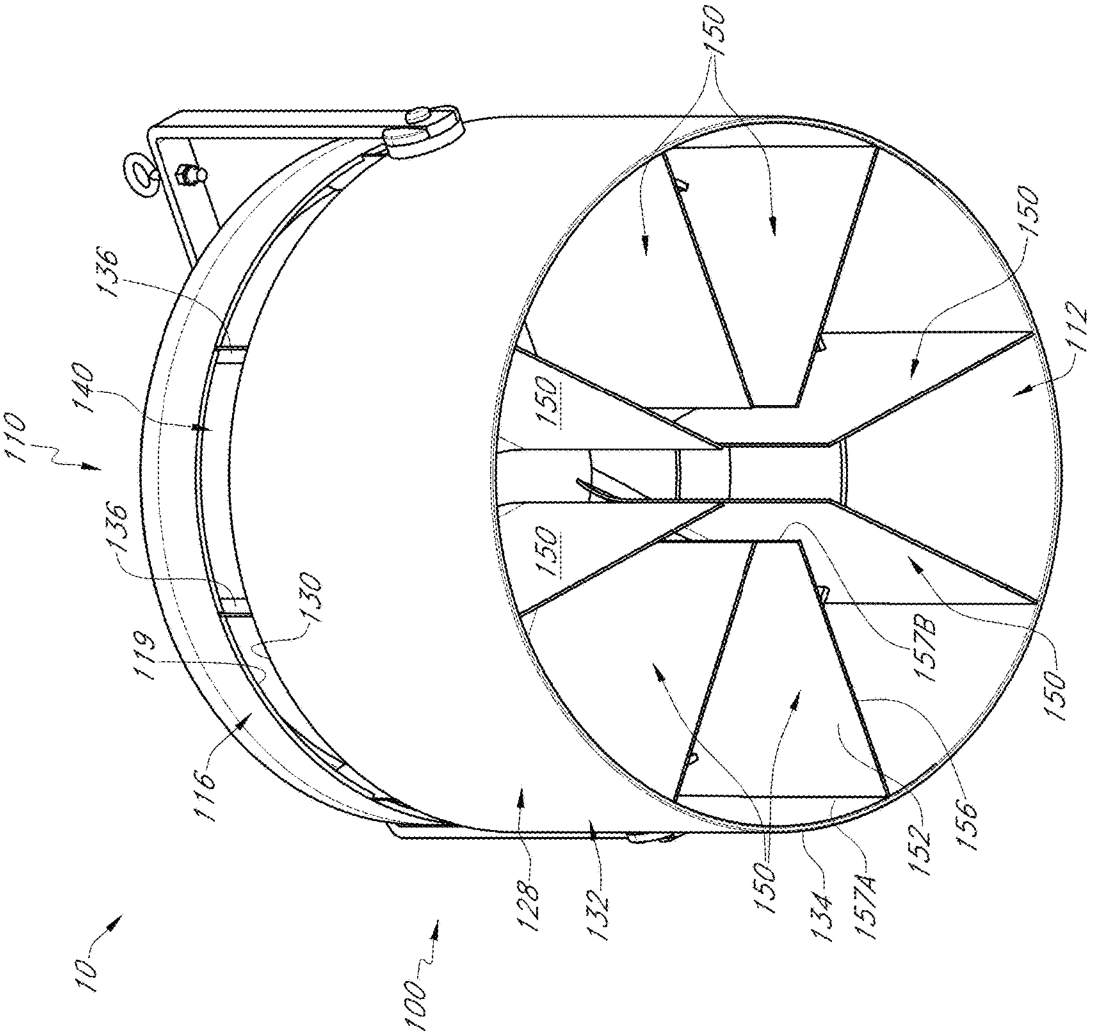

FIGS. 1 and 2 are top and bottom perspective views, respectively, of an embodiment of an air moving device 10. The air moving device 10 includes a housing 100. The housing 100 extends axially, as indicated by the labelled longitudinal "axis" in FIG. 1. The housing 100 is cylindrical, but it may have other desirably rounded shapes. The housing 100 extends from a primary inlet 110 to a primary outlet 112. Air flows into the housing 100 through the inlet 110 and out of the housing 100 through the outlet 112. As used herein, unless otherwise stated or indicated by context, "upper," "upward," "above," and the like refer to directions generally toward the primary inlet 110, "lower," "downward," "below" and the like refer to directions generally toward the primary outlet 112, "axial" and the like refers to directions generally parallel to the axis, "radial" and the like refers to directions generally perpendicular to the axis, and "annular" and the like refers to a generally rounded shape, for example a circular shape.

The housing 100 includes an upper portion 116. The upper portion 116 includes a radially inward extending annular upper lip 120. The upper lip 120 defines part of the primary inlet 110. The upper lip 120 may be smoothly rounded in a radial direction to allow for smooth airflow over the upper lip 120 and into the housing 100. The upper portion 116 includes an upper inner sidewall 122 extending downward from the upper lip 120 to a lower edge 123. The upper portion 116 includes an upper outer sidewall 118 extending downward from the upper lip 120. The upper outer sidewall 118 is located radially outward, relative to the axis, from the upper inner sidewall 122. The upper outer sidewall 18 extends downward to a lower outer edge 119. The upper portion 116 is cylindrical, but it may be other rounded shapes. The upper inner sidewall 122 may be contoured to define a nozzle. The upper inner sidewall 122 may thus extend axially downward from an upper first section having a first cross-sectional area to a lower second section having a second cross-sectional area that is less than the first cross-sectional area. In some embodiments, the air moving device 10, for example the housing 100, may include a grill 101 (see FIG. 3) at the inlet, for example located above the primary inlet 110.

The upper portion 116 may form a cowling as illustrated. The upper portion 116 may have a smoothly rounded upper lip 120 in a radial direction that smoothly extends to the upper inner sidewall 122. The upper inner sidewall 122 may be straight or smoothly curved. In some embodiments, the upper inner sidewall 122 may form a nozzle or nozzle-like shape, for example as illustrated the radial width of the lower edge 123 may be less than the radial width of the inlet 110. The upper inner sidewall 122 may have a constant or non-constant radial width along an axial direction. Further details of the width of the upper portion 116 are described herein, for example with respect to FIG. 6B. The upper portion 116, for example the cowling, may be integral with the lower portion 128, or they may be separate parts.

The housing 100 includes a lower portion 128. The lower portion 128 includes a lower outer sidewall 132. The lower outer sidewall 132 extends downward from an upper edge 130 to a lower edge 134. As illustrated, the lower edge 134 may be located at and define the primary outlet 112. The lower outer sidewall 132 may have the same or different outer width, for example diameter, as the upper outer sidewall 118.

The air moving device 10 includes an annular secondary inlet 140. The annular secondary inlet 140 is defined by the upper portion 116 and the lower portion 128. The annular secondary inlet 140 is located between the lower outer edge 119 of the upper outer sidewall 118 of the upper portion 116 and the upper edge 130 of the lower outer sidewall 132 of the lower portion 128. The lower outer edge 119 of the upper outer sidewall 118 may thus be an upper edge of the opening of the annular secondary inlet 140, and the upper edge 130 of the lower outer sidewall 132 may be a lower edge of the opening of the annular secondary inlet 140. The annular secondary inlet 140 provides a bypass intake for air to enter the housing 100 in a different location from that of the primary inlet 110. The annular secondary inlet 140 provides an opening to a secondary flow path, as further described herein.

The annular secondary inlet 140 may be an opening defined by parallel upper and lower edges 130, 119 as shown, such that the opening extends circumferentially and generally forms a belt-like shape. In some embodiments the upper and/or lower edge 130, 119 defining the annular secondary inlet 140 may be straight, curved, segmented, other shapes, or combinations thereof. In some embodiments, the upper and/or lower edge 130, 119 may be, or include features that are, rounded radially to provide a smooth contour for air entering the annular secondary inlet 140.

The annular secondary inlet 140 extends continuously around the outer perimeter, for example circumference, of the housing 100. In some embodiments, the annular secondary inlet 140 may not extend continuously around the entire outer perimeter of the housing 100. For example, there may be multiple annular segments of the annular secondary inlet 140 separated by solid wall and/or other features therebetween, for example separated by portions of the upper outer sidewall 118 or the lower outer sidewall 132.

There may be one continuous annular secondary inlet 140 or separate segments of the annular secondary inlet 140 extending along the same or similar axial location of the housing 100. For instance, the inlet or inlets 140 may be aligned circumferentially about the housing 100. In some embodiments, there may be a second continuous annular secondary inlet, 140 or second separate segments of the annular secondary inlet 140, located axially above and/or below the annular secondary inlet 140. Further, the annular secondary inlet or inlets 140 may be entirely open as shown, or they may have screens or other porous structures over some or all of the openings of the annular secondary inlet or inlets 140. Therefore, the particular embodiment of the annular secondary inlet 140 shown and described herein is merely one example, and other configurations and features may be implemented that are within the scope of the disclosure.

The air moving device 10 includes a plurality of longitudinal ribs 136. The ribs 136 extend axially and radially between the upper and lower portions 116, 128. The ribs 136 may connect the upper portion 116 with the lower portion 128. The ribs 136 may be distributed angularly about the axis within the housing 100, as further described.

The air moving device 10 includes a handle 102. The handle 102 extends from a first side of the housing 100 to a second opposite side of the housing 100. The air moving device 10 may be hung from an enclosure, such as a ceiling in a building, using the handle 102. The handle 102 may be connected to the housing 100 at rotatable connections 104. The connections 104 may allow for angling the air moving device 10 about a perpendicular axis that is perpendicular to the longitudinal axis shown in FIG. 1.

As shown in FIG. 2, the air moving device 10 includes a plurality of the longitudinal vanes 150. The vanes 150 extend axially within the housing 100. As viewed from above, the vanes 150 may be in locations that are distributed angularly with respect to the longitudinal axis of the air moving device 10. The vanes 150 may be evenly distributed about the axis as shown. Some or all of the vanes 150 may be radially and angularly aligned with respective ribs 136. In some embodiments, each vane 150 is aligned radially with a respective rib 136. The vanes 150 include a flat portion 152 that extends longitudinally downward to a lower edge 156. The lower edge 156 may be located at the outlet 112, as shown, or it may not be located at the outlet 112. The vanes 150 have an outer edge 157A that attaches to and extends radially inwardly from an inner surface of the lower outer sidewall 132 to an inner edge 157B of the vane 150. The inner edges 157B of opposite vanes 150 may be separated as shown, or they may connect with other vanes 150 at or near the axis of the air moving device 10. The vanes 150 may include an upper curved portion 158 having an upper edge 154, as further described herein, for example with respect to FIGS. 4 and 6A.

The vanes 150 may be integral with the lower portion 128. In some embodiments, the vanes 150, the lower portion 128, and the upper portion 116 may be integral. In some embodiments, the vanes 150, the lower portion 128, the upper portion 116 and the ribs 136 may be integral. The various integral combinations of parts of the housing 100 may be injection molded, or formed using other suitable methods. In some embodiments, the various parts are made separately and attached together. In some embodiments, the upper portion 116 may be a cowling, which may be integral with one or more of the vanes 150, the lower portion 128, and the ribs 136, or the cowling may be removeably attached with one or more of the vanes 150, the lower portion 128, and the ribs 136.

Figure 3:
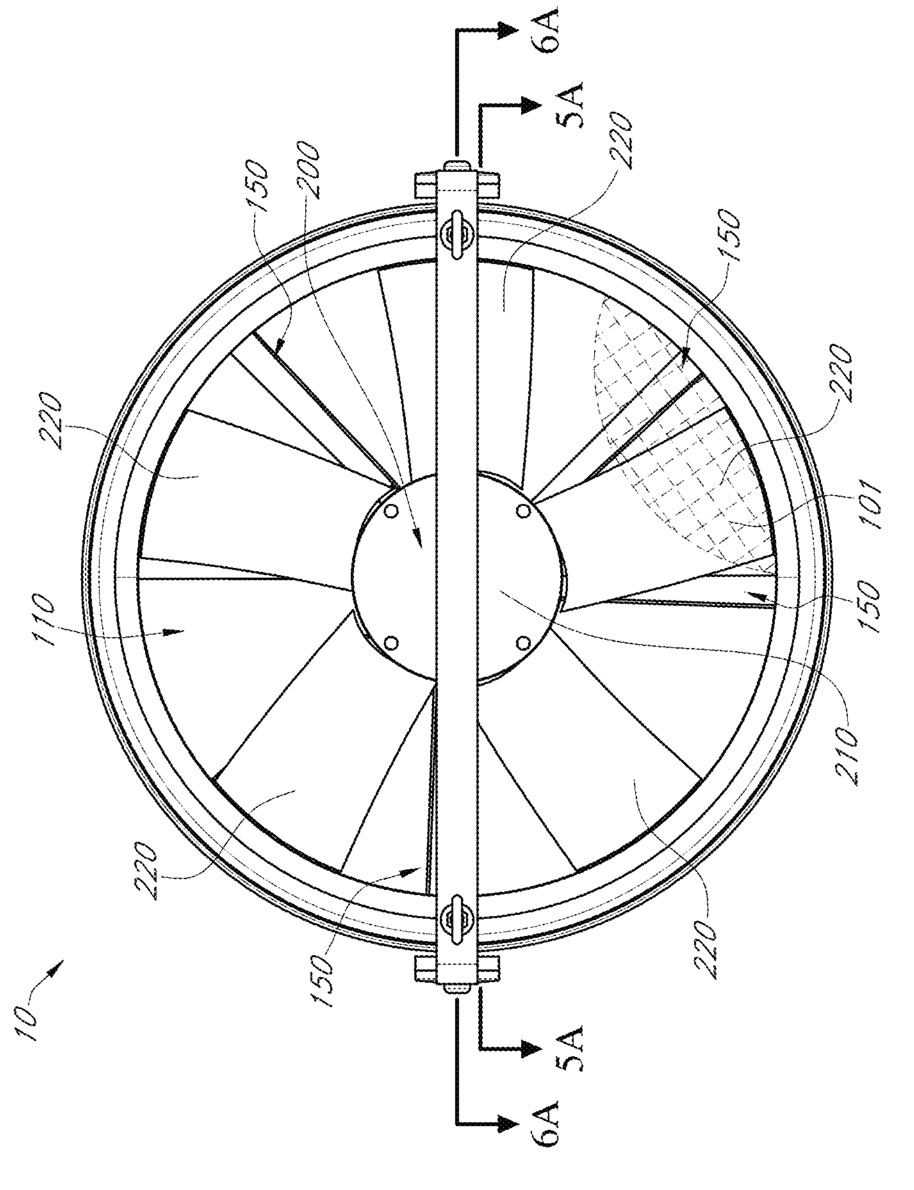
FIGS. 3 and 4 are top and bottom views, respectively, of the device of FIG. 1.
Figure 4:
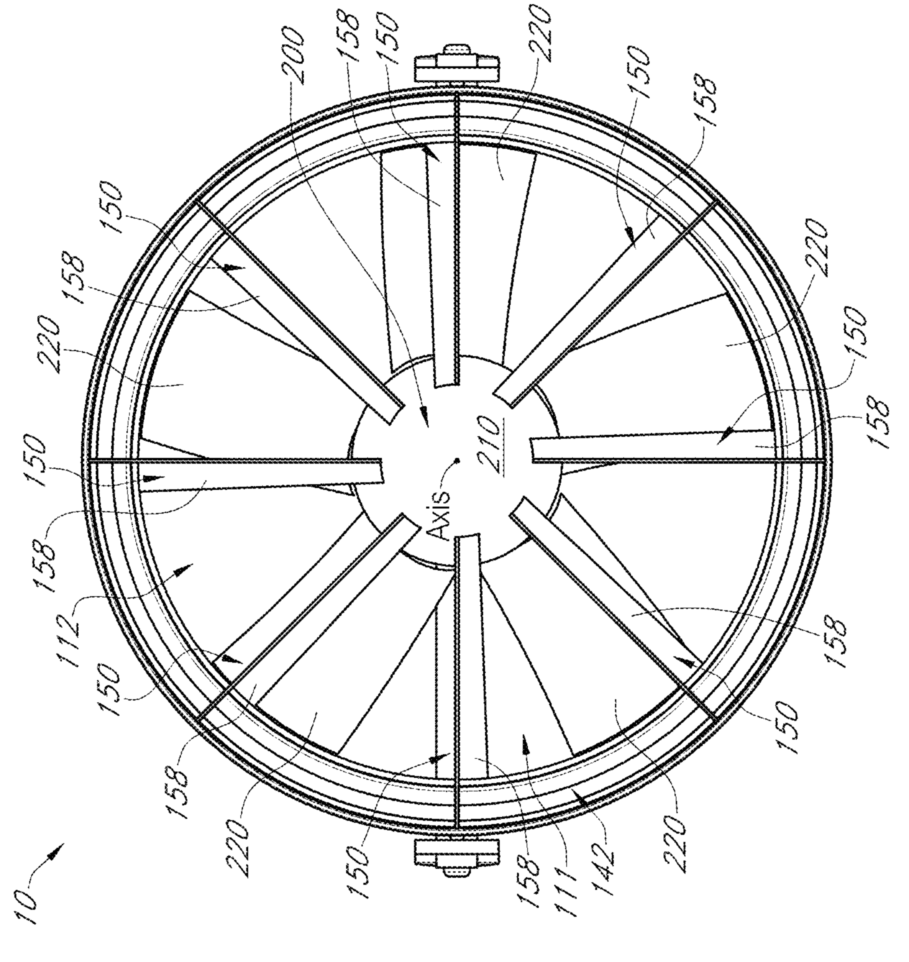

FIGS. 3 and 4 are top and bottom views, respectively, of the air moving device 10. The impeller assembly 200 includes a motor 210 and a plurality of blades 220. The motor 210 may be an electric motor supplied with power from a power cord or batteries. A fixed portion of the motor 210, such as a hub or motor case, may be supported by the housing 100. Alternatively, or in addition, the motor 210 may be supported by the grill 101, such as a grate or other suitable structure, which for clarity is partially shown in phantom lines in FIG. 3 and is not shown in most figures. The grill 101 may have various embodiments, for example as shown and described in U.S. Pat. No. 9,335,061, titled "Columnar Air Moving Devices, Systems and Methods" and issued May 10, 2016, the entire content of which is incorporated herein by reference for all purposes and forms a part of this specification. The grill 101 may be located partially or entirely above the impeller assembly 200, or otherwise support the impeller assembly 200 above the blades 220. The grill 101 may provide safety to prevent injury to users or animals from the rotating blades 220. A rotational portion of the motor 210 may rotate the blades 220. The blades 220 extend axially outward from the motor 210. There are five blades 220, but there may be one, two, three, four, six, seven, eight, nine, ten, eleven, twelve, or more blades 220. The motor 210 rotates the blades 220 about the longitudinal axis of the air moving device 10 to cause air to enter the primary inlet 110. The blades 220 may be aerodynamically shaped to optimize volumetric air flow through the primary inlet 110.

The impeller assembly 200 may be supported by the housing 100. The motor 210 may be supported by upper portions of the vanes 150, such as radially inward portions of the upper edges 154 of the vanes 150. In some embodiments, the impeller assembly 200 may be supported by a support structure, such as a rib that connects the impeller assembly 200 with the upper portion 116 of the housing 100. The support structure may be located above or below the blades 220. Various suitable support structures may be implemented, for example as described in U.S. Patent Publication No. 2016/0146222, titled "Air Moving Device" and Published May 26, 2016, the entire content of which is incorporated herein by reference for all purposes and forms a part of this specification.

Figure 5A:
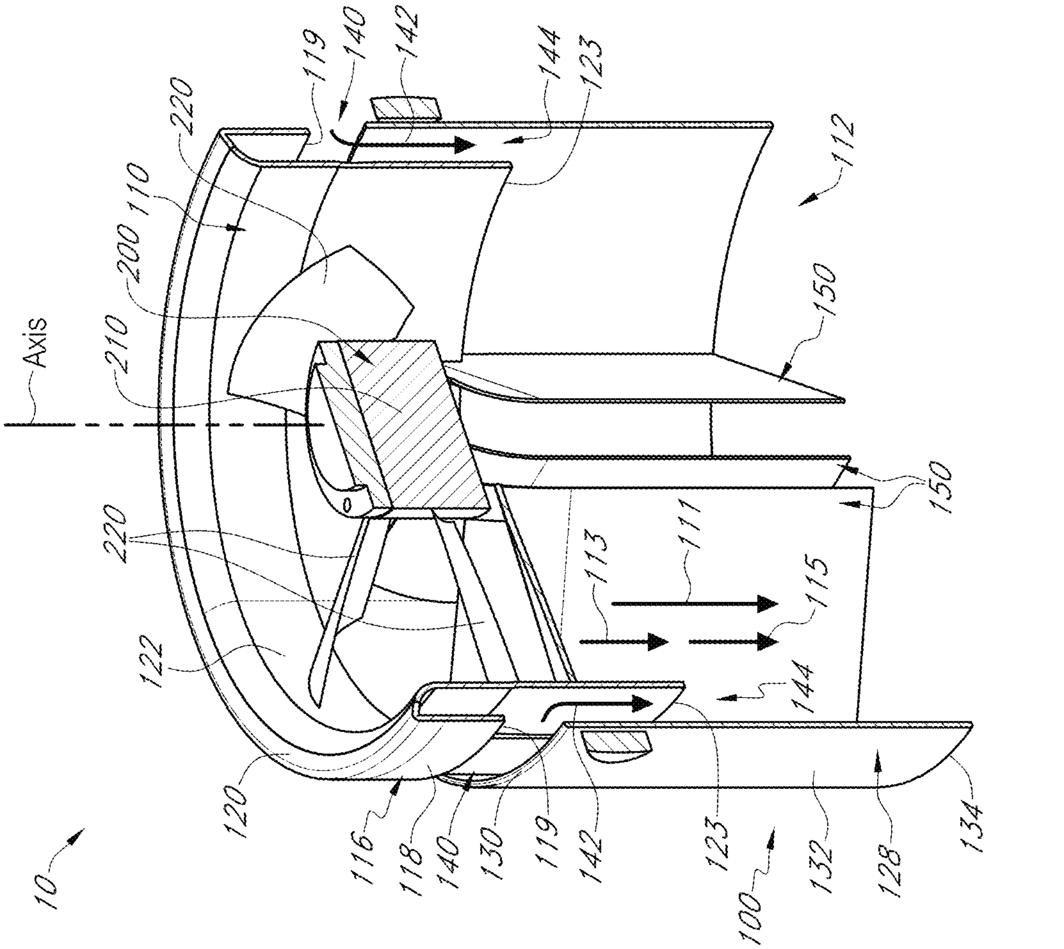
FIGS. 5A and 5B are cross-section views of the device of FIG. 3 as taken along the line 5A-5A shown in FIG. 3.
Figure 5B:
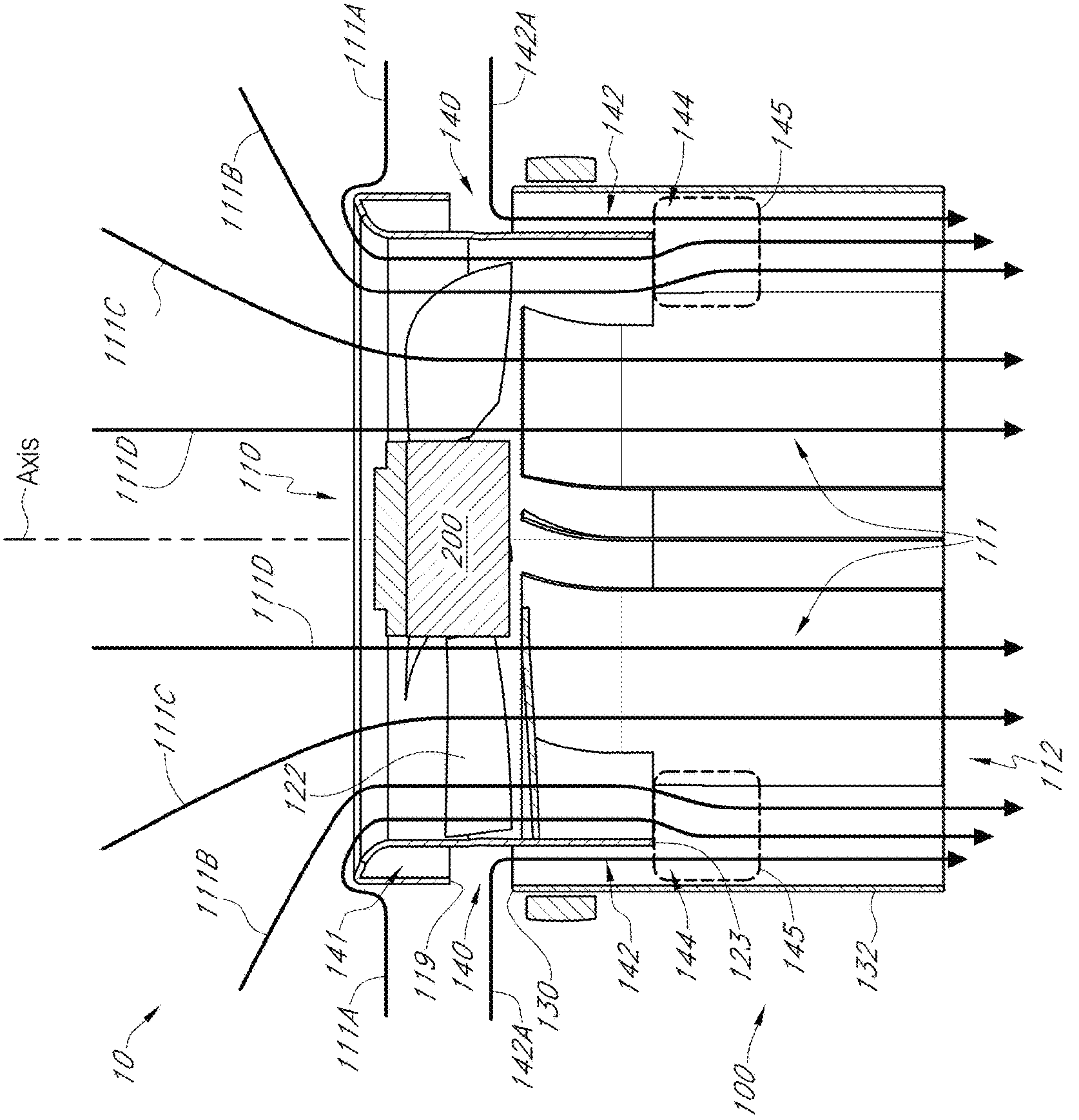

FIGS. 5A and 5B are cross-section views of the air moving device 10 as taken along the line 5A-5A shown in FIG. 3. FIG. 5A is a perspective cross-section view, and FIG. 5B is a side cross-section view.

As shown in FIG. 5A, the air moving device 10 defines a primary flow path 111. The primary flow path 111 is indicated by the geometric arrow for reference. The primary flow path 111 extends from within the upper portion 116 of the housing to within the lower portion 128 of the housing 100. The primary flow path 111 may extend from the primary inlet 110 to the primary outlet 112.

The primary flow path 111 may extend from and between the upper lip 120 downward between the upper inner sidewall 122. The primary flow path 111 may continue downward between the lower outer sidewall 132. The primary flow path 111 may terminate at the outlet 112 of the housing 100, for example at the lower edge 134.

The primary flow path 111 includes an upper region 113 and a lower region 115. The upper region 113 is located within the upper portion 116 of the housing 100. The lower region 115 is located below the upper region 113, within at least part of the lower portion 128 of the housing 100. The upper region 113 may include a portion of the primary flow path 111 that is flowing through a part of the housing 100 having a first cross-sectional area. The lower region 115 may include a portion of the primary flow path 111 that is flowing through a part of the housing 100 having a second cross-sectional area that is greater than the first cross-sectional area. A width W1 of the housing 100 within the upper region 113 may be less than a width W2 of the housing within the lower region 115, as further described herein, for example with respect to FIG. 6B.

The secondary flow path 142 extends from the annular secondary inlet 140 to a secondary outlet 144. The secondary flow path 142 is indicated by the geometric arrow for reference. The secondary outlet 144 may have an annular shape as shown, or other shapes. The secondary outlet 144 may have features to facilitate air flow, such as rounded edges, etc.

The secondary flow path 142 may extend from and between the lower outer edge 119 of the upper outer sidewall 118 and the upper edge 130 of the lower outer sidewall 132. The secondary flow path 142 may continue downward between an inner surface of the lower outer sidewall 132 and an outer surface of the upper inner sidewall 122. The secondary flow path 142 may terminate between the lower edge 123 of the upper inner sidewall 122 and an inner surface of the lower outer sidewall 132. The air moving device 10 may include a pocket 141 located above the secondary flow path 142. The pocket 141 may be part of the secondary flow path 142. The pocket 141 may be hollow. In some embodiments, the pocket 141 may be partially hollow, may not be hollow, or there may not be a pocket 141.

The secondary outlet 144 is located adjacent the primary flow path 111. Thus air entering the secondary flow path 142 via the annular secondary inlet 140 flows through the secondary outlet 144 and mixes with air in the primary flow path 111. The air flowing along the primary flow path 111 adjacent to the secondary outlet 144 will cause a lower pressure at the secondary outlet 144 relative to the air pressure at the annular secondary inlet 140. For example, the ambient air adjacent the annular secondary inlet 140 may be static or not flowing as fast as the air in the primary flow path. The resulting differential pressures between the secondary outlet 144 and the annular secondary inlet 140 will cause air to flow along the secondary flow path 142 in the direction indicated and empty into the primary flow path 111, which may be at the lower region 115 of the primary flow path 115.

FIG. 5B shows examples of various air flow paths 111A, 111B, 111C and 111D along which the air flowing along the primary flow path 111 may move. Air in the path 111A may flow from outside the housing 100 and over the lip 120. Air in the paths 111B, 111C, 111D may flow, respective, at progressively decreasing angles with the longitudinal axis into the housing 100. The paths may straighten out within the primary flow path 111 located within the housing 100. Further, air moving within the secondary flow path 142 may move along the air flow path 142A as indicated.

The air moving device 10 may include a mixing region 145, which is indicated in FIG. 5B with a geometric box for reference. The mixing region 145 is a region within the housing extending along and near the annular secondary inlet 140, for example at the intersection of the secondary flow path 142 and the primary flow path 111 within the housing 100. The mixing region 145 may therefore be annular in shape. The mixing region 145 is where the air from the secondary flow path 142 mixes with the air from the primary flow path 111. Air from the primary flow path 111, for example flowing along the paths 111A and/or 111B, may move radially outward to mix with the air from the secondary flow path 142. The air from the primary flow path 11 may move radially outward due to lower pressures within the mixing region 145.

Figure 6A:
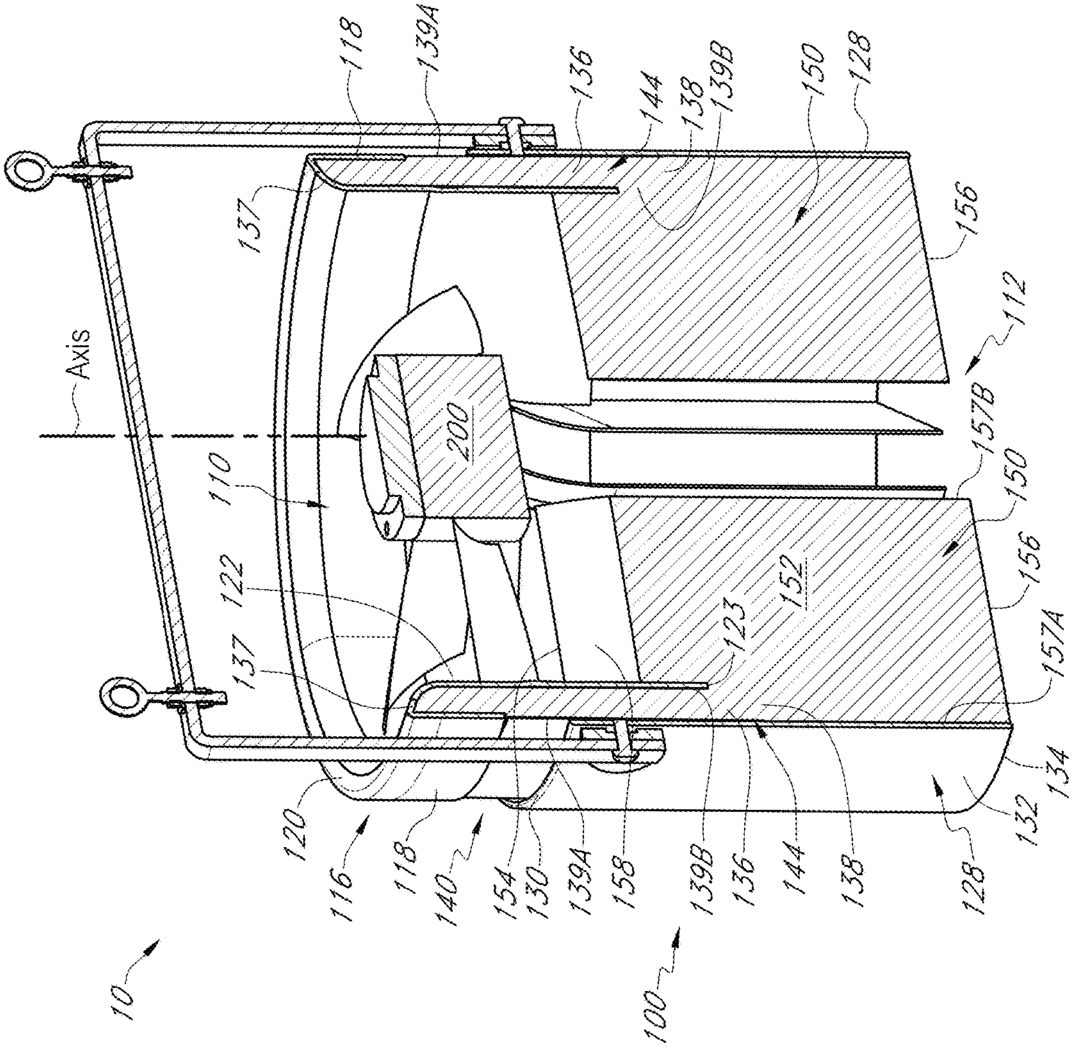
FIGS. 6A and 6B are cross-section views of the device of FIG. 3 as taken along the line 6A-6A shown in FIG. 3.
Figure 6B:
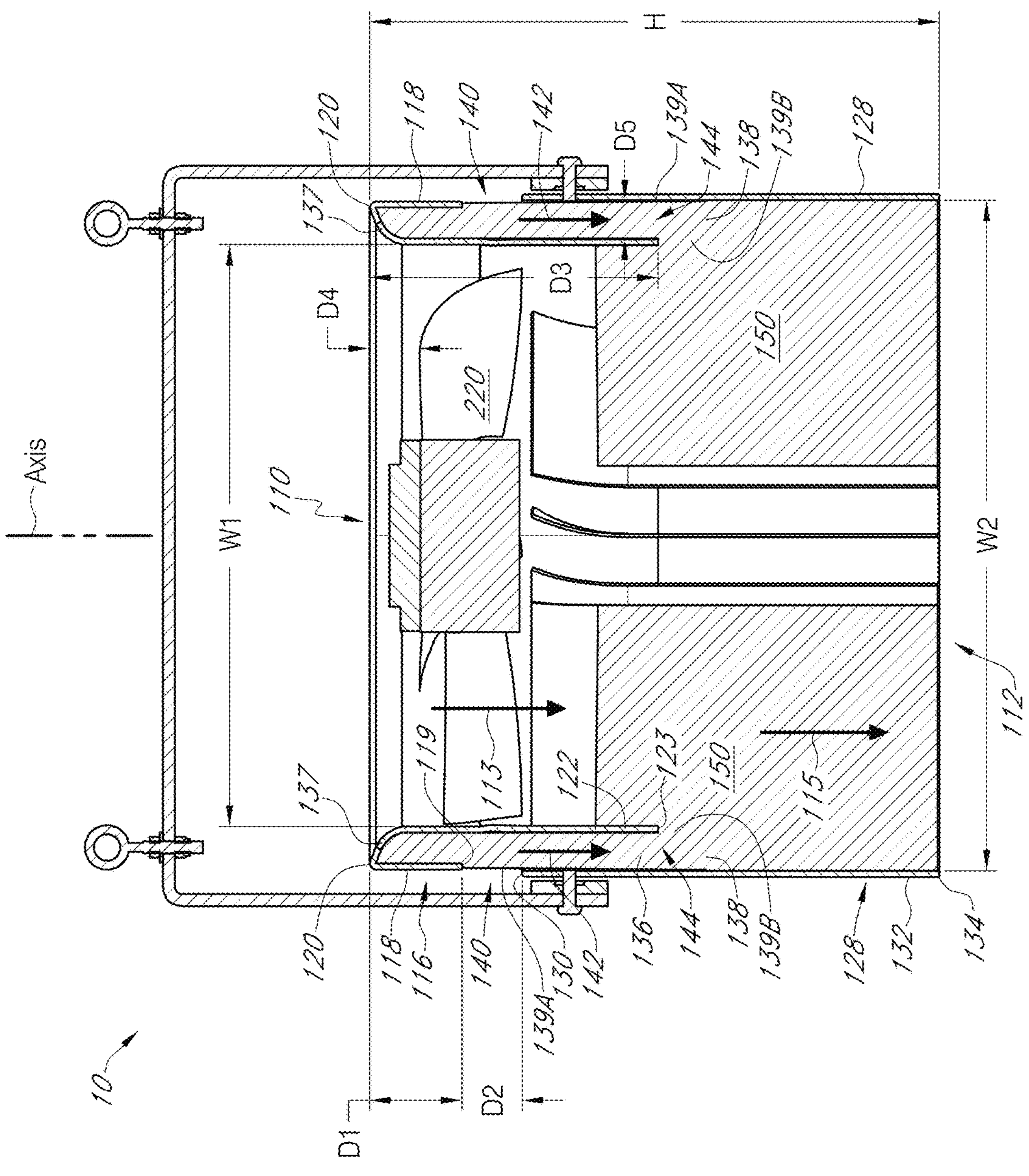

FIGS. 6A and 6B are cross-section views of the air moving device 10 as taken along the line 6A-6A shown in FIG. 3. FIG. 6A is a perspective cross-section view and FIG. 6B is a side cross-section view.

As shown in FIGS. 6A and 6B, the air moving device 10 includes longitudinal ribs 136 and vanes 150. The ribs 136 each extend from a top edge 137 axially downward to a respective vane 150. The ribs 136 may extend to a lower edge 138, which may be a portion of the vane 150. The ribs 136 extend radially inward from an outer edge 139A to an inner edge 139B. The top edge 137 connects with the upper portion 116 of the housing 100. As shown, the top edge 137 and part of the outer and inner edges 139A, 139B connect with the upper portion 116. The top edge 137 and upper portions of the outer and inner edges 139A, 139B are attached respectively with the upper outer sidewall 118, the upper lip 120, and the upper inner sidewall 122. A portion of the rib 136 located below the annular secondary inlet 140 is attached to an inner surface of the lower outer sidewall 132 and to the respective vane 150. The ribs 136 may each be integral with and/or form a continuous surface with a portion of a respective vane 150. The ribs 136 may be continuous with a flat portion of the respective vane 150. Thus the adjacent rib 136 and vane 150 may be continuous below the upper inner sidewall 122, with the upper inner sidewall 122 separating an upper portion of the rib 136 from an upper portion of the flat portion of the vane 150. The upper portion of the vane 150 may bend or curve, as described herein.

In some embodiments, the ribs 136 may not connect with or be integral with the respective vane 150. For example, the vanes 150 may be angularly aligned differently from the ribs 136, or there may not be any vanes 150. The lower edge 138 of the rib 136 may be located below the lower edge 123 of the upper inner sidewall 122. The lower edge 138 of the rib 136 may be located closer to the lower edge 123 of the upper inner sidewall 122 than to the lower edge 134 of the lower outer sidewall 132. The lower edge 138 of the rib 136 may be in other locations, for example above the lower edge 123 of the upper inner sidewall 122, or closer to the lower edge 134 of the lower outer sidewall 132 than to the lower edge 123 of the upper inner sidewall 122, etc. There are eight ribs 136, but there may be none, one, two, three, four, five, six, seven, nine, ten eleven, twelve, or more ribs 136.

As shown in FIG. 6B, the ribs 136 may extend along at least a part of the secondary flow path 142. The ribs 136 may straighten the flow of air entering the annular secondary inlet 140. The ribs 136 may separate compartments of the secondary flow path 142, as further described herein, for example with respect to FIG. 8.

The vanes 150 have an upper edge 154. The upper edge 154 is located within the upper region 113 of the primary flow path 111. The upper edge 154 may be located at the same axial location as the upper edge 130 of the lower outer sidewall 132. In some embodiments, the upper edge 154 may located axially above or below this location. The upper edge 154 is on the upper end of the curved portion 158. The curved portion 158 curves perpendicularly to a radial direction of the housing 100. Each of the curved portions 158 curve in the same direction. In some embodiments, some or all of the vanes 150 may not include the curved portion 158.

The vanes 150 have the flat portion 152 extending axially downward from the curved portion 158 to the lower edge 156. The vanes 150 may be integral with, or otherwise couple with, a respective longitudinal rib 136. Thus, the vane 150 and respective rib 136 may form a continuous structure.

As further shown in FIG. 6B, the housing 100 may have a first radial width W1 and a second radial width W2. The widths W1, W2 are measured perpendicular to the longitudinal axis of the housing. The first width W1 may be an inner width of the upper portion 116 of the housing 100. The first width W1 may correspond to an inner width of an axial location of the housing 100 in which the upper region 113 of the primary flow path 111 is located. As shown, the first width W1 may be measured between opposite radial locations of the upper inner sidewall 122. The second width W2 may be an inner width of the lower portion 128 of the housing 100. The second width W2 may correspond to an inner width of an axial location of the housing 100 in which the lower region 115 of the primary flow path 111 is located. As shown, the second width W2 may be measured between opposite radial locations of the lower outer sidewall 132. The second width W2 may be measured between opposite radial locations of an upper portion of the lower outer sidewall 132 that is immediately below the secondary outlet 144 and/or lower edge 123 of the upper inner sidewall 122.

The widths W1, W2 may be constant axially along their respective locations. The widths W1, W2 may be diameters, where the respective sections are cylindrical. In some embodiments, the widths W1, W2 may change at different axial locations along their respective locations. In some embodiments, the width W1 may decrease from an upper portion of the upper inner sidewall 122 to a lower portion of the upper inner sidewall, for example where the upper inner sidewall 122 forms a nozzle or cowling. In such cases, the first width W1 may refer to the width of the outlet or lower end of the nozzle cowling, for example as measured between opposite radial locations of the lower edge 123 of the upper inner sidewall 122.

The width W2 is greater than the width W1. The width W2 may be greater than the width W1 by 3%, 5%, 7%, 10%, 15%, 20% or more. The increased second width W2 relative to the first width W1 creates a low pressure area at the secondary outlet 144. The expanded cross-sectional area due to the increased width W2 thus creates a low pressure zone that pulls in air through the secondary flow path 142. This induces mixing of the air flowing from the secondary flow path 142 and the air flowing along the primary flow path 111 near the secondary outlet 144.

In some embodiments, W1 is from 4 inches to 12 inches. W1 may be 4 inches, 5 inches, 6 inches, 7 inches, 8 inches, 9 inches, 10 inches, 11 inches, 12 inches, or more. W1 may be at least 4 inches, at least 5 inches, at least 6 inches, at least 7 inches, at least 8 inches, at least 9 inches, at least 10 inches, at least 11 inches, or at least 12 inches. In some embodiments, W2 is from 5 inches to 13 inches. W2 may be 5 inches, 6 inches, 7 inches, 8 inches, 9 inches, 10 inches, 11 inches, 12 inches, 13 inches, or more. W2 may be at least 4 inches, at least 5 inches, at least 6 inches, at least 7 inches, at least 8 inches, at least 9 inches, at least 10 inches, at least 11 inches, at least 12 inches, or at least 13 inches. W2 may be 1 inch or about 1 inch greater than W1. In some embodiments, W2 may be 0.5 inches greater than W1, 0.75 inches, 1.25 inches greater than W1, 1.5 inches greater than W1, 1.75 inches greater than W1, or 2 inches greater than W1.

As further shown in FIG. 6B, the lower edge 123 of the upper inner sidewall 122 is located an axial distance D3 from the upper lip 120. The distance D3 may be the axial distance from the lower edge 123 of the upper inner sidewall 122 to the upper edge of the upper lip 120, to the upper end of the curved edge 137, or to the upper-most portion of the upper inner sidewall 122 (e.g. the flat portion thereof). The distance D3 may be about 5.5 inches. In some embodiments, the distance D3 may be greater than or equal to 2 inches, greater than or equal to 3 inches, greater than or equal to 4 inches, greater than or equal to 5 inches, or greater than or equal to 6 inches.

As further shown in FIG. 6B, the upper lip 120 is located an axial distance D4 from an upper edge of the fan blades 220. The distance D4 may be the axial distance from an upper-most portion of the edges of the blades 220 to the upper edge of the upper lip 120, to the upper end of the curved edge 137, or to the upper-most portion of the upper inner sidewall 122 (e.g. the flat portion thereof). The distance D4 may be greater than or equal to 0.5 inches, greater than or equal to 1 inch, greater than or equal to 1.5 inches, greater than or equal to 2 inches, greater than or equal to 2.5 inches, greater than or equal to 3 inches, greater than or equal to 3.5 inches, or greater than or equal to 4 inches.

As further shown in FIG. 6B, the secondary flow path 142 has a radial width extending a distance D5. The secondary flow path 142 may have a minimum radial width extending the distance D5, for example where the secondary flow path 142 has a non-uniform width along its axial length, such as with an hour glass, narrowing, widening, or other shaped secondary flow path 142 or portions thereof. The inner surface of the lower outer sidewall 132, or portion thereof, may be located a radial distance D5 from the outer surface of the upper inner sidewall 122, or from a portion thereof. The secondary flow path 142 may have a radial width of distance D5 along all or most of its axial length. Thus the radial width of the channel formed by the secondary outlet 144 may be uniform or substantially uniform along its axial length. The portion of the secondary flow path 142 located below the secondary inlet 140 may have a radial width of distance D5. In some embodiments, the space above the secondary flow path 142, for example between an inner surface of the upper outer sidewall 118 and an outer surface of the upper portion of the upper inner sidewall 122, may be radially separated by the distance D5. The distance D5 may be 0.8 inches or about 0.8 inches. In some embodiments, the distance D5 may be greater than or equal to 0.25 inches, greater than or equal to 0.375 inches, greater than or equal to 0.5 inches, greater than or equal to 0.625 inches, greater than or equal to 0.75 inches, greater than or equal to 0.875 inches, greater than or equal to 1 inch, greater than or equal to 1.125 inches, greater than or equal to 1.25 inches, greater than or equal to 1.375 inches, greater than or equal to 1.5 inches, or greater than or equal to 1.75 inches. Any of the dimensions for D5 described herein may also apply to the radial opening of the secondary outlet 144 of the secondary flow path 142.

The various dimensions of the device 10 may be sized or designed to achieve desired air flow performance goals. In some embodiments, D2 and D5 may be related. For example, D2 may be, or be about, 0.8×D5 (i.e., 0.8 multiplied by D5). In some embodiments, D2 may be greater than or equal to 0.6×D5, 0.7×D5, 0.8×D5, 0.9×D5, 1.0×D5, 1.1×D5, 1.2×D5, 1.3×D5, 1.4×D5, or 1.5×D5.

In some embodiments, the area of the outer opening(s) or space(s) defined by the secondary inlet 140 along the outside of the device 10 may be related to the cross-sectional area of the secondary flow path 142 located between the lower outer sidewall 132 and the upper inner sidewall 122. The area of the secondary inlet 140 may be approximated by the product of D2 and the circumference of the upper edge 130. The cross-sectional area of the secondary flow path 142 may be measured perpendicularly to the axis of the device 10 and may be approximated by the product of D5 and either W1 or W2. In some embodiments, the cross-sectional area of the secondary inlet 140 may be greater than or equal to 0.6, 0.7, 0.8, 0.9, 1.0, 1.1, 1.2, 1.3, 1.4, or 1.5 multiplied by the cross-sectional area of the secondary flow path 142. The cross-sectional area of the secondary inlet 140 and the cross-sectional area of the secondary flow path 142 may be about the same. For purposes of this application, unless otherwise stated, these relationships are based on cross-sectional areas which do not include any area obstructed by features within the opening of the secondary inlet 140 or within secondary flow path 142, such as the ribs 136, screws, etc. Thus, any area actually taken up by a rib by default is not considered part of the cross-sectional area. On the other hand, if specifically so stated, these relationships may be based on a cross-sectional area which includes any area(s) obstructed by features within the opening of the secondary inlet 140 or within secondary flow path 142, such as the ribs 136, screws, etc. In particular, the relationships discussed above could be used regardless of whether an area obstructed by features is included in the calculation of the cross-sectional area.

Such relations between D1 and D5, or between the area of the secondary inlet 140 and the cross-sectional area of the secondary flow path 142, may result in greater thrust being produced by the device 10, allowing for less energy usage and related savings in cost of using the device 10, and other benefits as described herein. Such relations may allow for 5% or more, 7% or more, 10% or more, 15% or more, or 20% or more thrust as compared to an air moving device that did not have the bypass intake features described herein, such as the secondary flow path 142.

In some embodiments, D1, D2 and D3 may be related. In some embodiments, the secondary inlet 140 may not extend axially below the lower edge 123 of the upper inner sidewall. For example, D3 may be greater than or equal to the sum of D1 and D2, i.e. D3≥D1+D2. In some embodiments, D3×0.9≥D1+D2, D3×0.8≥D1+D2, D3×0.7≥D1+D2, D3×0.6≥D1+D2. In some embodiments, the secondary inlet 140 may axially extend below or slightly below the lower edge 123. For example, in some embodiments, D3×1.1≥D1+D2, D3×1.2≥D1+D2, D3×1.3≥D1+D2, or D3×1.4≥D1+D2. In some embodiments, D1, D2 and/or D3 may be sized such that the mixing region 145 (see FIG. 5B) is located at or near the lower end of the secondary flow path 142.

The mixing of air from the primary and secondary flow paths 111, 142 creates more thrust for a given power input. In other words, less power is needed to achieve a given thrust. The low pressure zone pulls in the ambient air through the annular secondary inlet 140 and through the secondary flow path 142 into the primary flow path 111. This in effect creates another source of thrust for the air flowing through the housing 100. The air flowing from the secondary flow path 142 thus has a velocity with an axial component in the direction of the air flowing in the primary flow path 111. The axial component of the secondary air is additive with the already flowing primary air flow to create more thrust for a given rotational speed of the impeller assembly 200.

The housing 100 may have an overall axial height H. The height H may be measured axially from the upper lip 120 to the lower edge 134 of the housing 100. The height H may be greater than the second width W2. The height H may be greater than the second width W by 5%, 10%, 15%, 20%, 25% or more. In some embodiments, the height H be the same as or less than the second width W2. The height H may be designed to provide a desired "throw" or length of column of air emitted from the device 10. The height H may be increased to provide for a longer throw. The height H may be decreased for a shorter throw. The height H may be designed to control the lateral dispersion of the air omitted from the device 10. The height H may be decreased to provide more lateral dispersion of the air omitted from the device 10, for example to have a wider column of air emitted and/or to emit a conical-shaped stream of air from the device 10.

Figure 7:
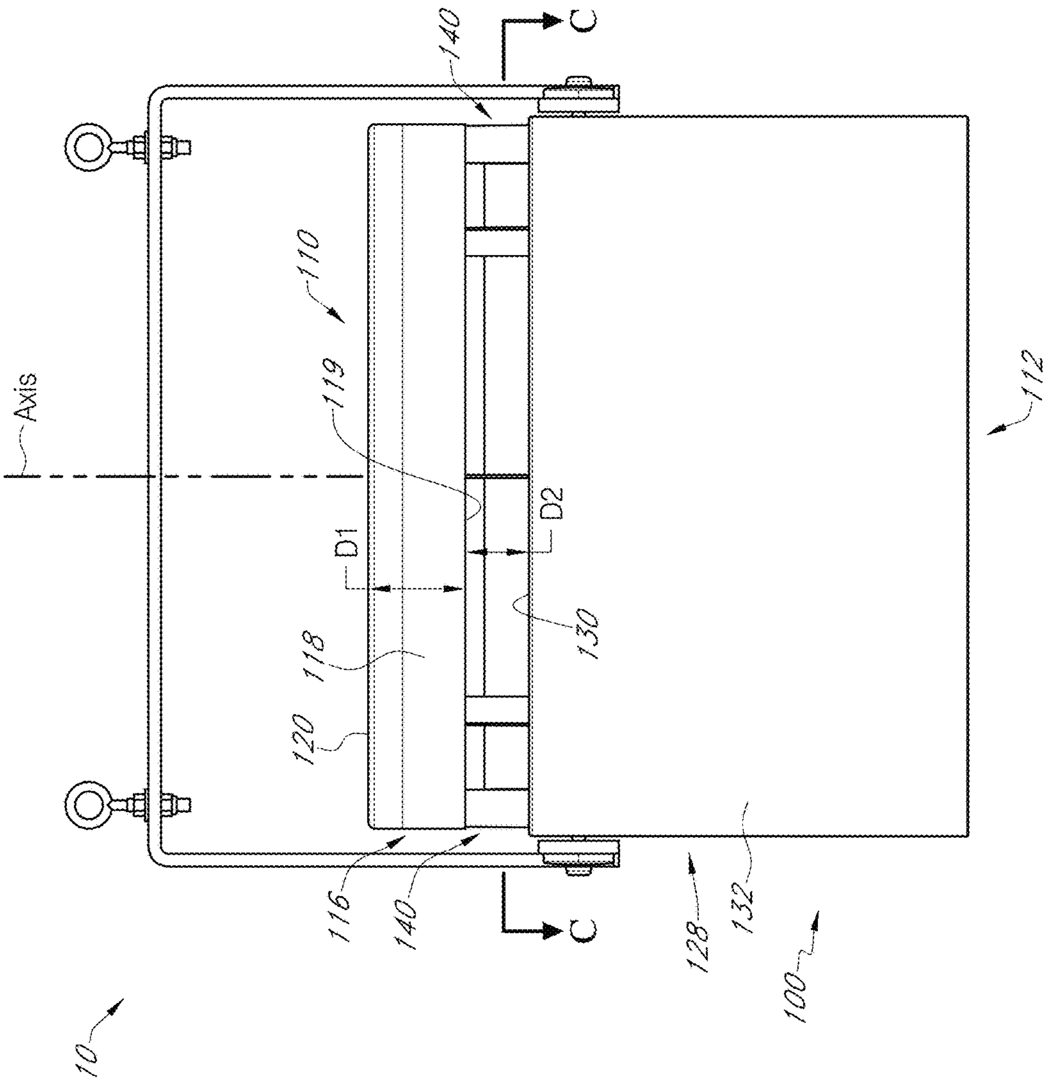
FIG. 7 is a side view of the device of FIG. 1.

FIG. 7 is a side view of the air moving device 10. As shown in FIGS. 6B and 7, an upper portion of the annular secondary inlet 140 may be located an axial distance D1 from the inlet 110. The axial distance D1 may be measured from the upper lip 120 to the lower outer edge 119 of the upper outer sidewall 118. In some embodiments, the axial distance D1 may refer to only the flat portion of the upper outer sidewall 118. The distance D1 is less than 50% of the height H. In some embodiments, the distance D1 may be less than 50%, 40%, 30%, 20%, 10% or less of the height H.

The annular secondary inlet 140 may extend an axial height of distance D2. The distance D2 may be measured from the lower outer edge 119 of the upper outer sidewall 118 axially to the upper edge 130 of the lower outer sidewall 132. The distance D2 may be constant circumferentially along the annular secondary inlet 140. In some embodiments, the distance D2 may not be constant circumferentially along the annular secondary inlet 140.

The distance D1 is greater than the distance D2. The distance D2 may be equal to the distance D1. In some embodiments, the distance DI is greater than the distance D2 by 5%, 10%, 15%, 20%, 25% or more. In some embodiments, the distance D1 is at least 1.0, 1.1, 1.2, 1.3, 1.4, or 1.5 times the distance D2. In some embodiments, the distance D1 is at least 0.6, 0.7, 0.8, 0.9, or 1.0 times the distance D2. Thus, in some embodiments, the distance D2 may be greater than the distance D1. In some embodiments, there may be multiple annular secondary inlets 140 extending circumferentially, for example parallel, to each other, and each of the multiple annular secondary inlets 140 may have the axial distance D2 as described herein. D2 is 1.25 inches. In some embodiments, D2 may be 0.25 inches, 0.375 inches, 0.5 inches, 0.625 inches, 0.75 inches, 0.875 inches, 1 inch, 1.125 inches, 1.25 inches, 1.375 inches, 1.5 inches, 1.625 inches, 1.75 inches, 1.875 inches, 2 inches, 2.25 inches, 2.5 inches, 3 inches, or about any of the foregoing lengths. In some embodiments, D2 may be less than D1.

Figure 8:
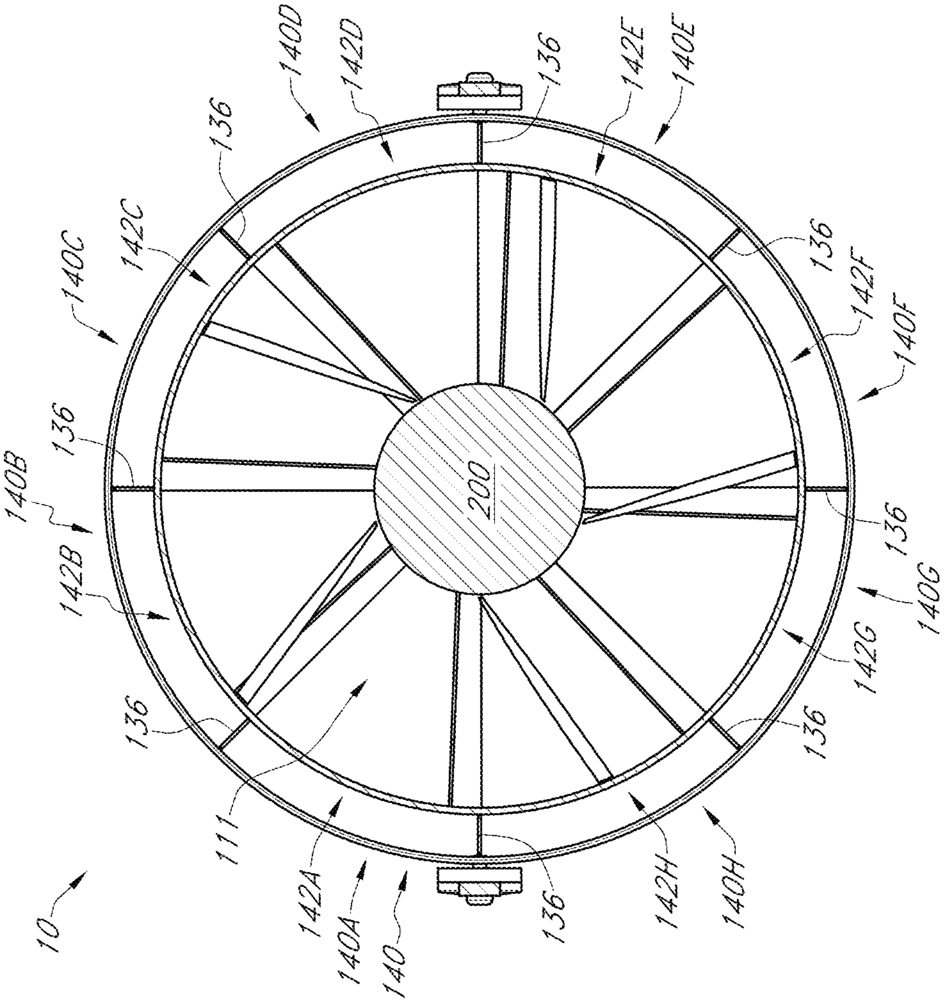
FIG. 8 is a cross-section view of the device of FIG. 7 as taken along the line C-C shown in FIG. 7.

FIG. 8 is a cross-section view of the air moving device 10 as taken along the line C-C shown in FIG. 7. As shown in FIG. 8, the ribs 136 may be angularly distributed evenly about the housing 100. Further, the ribs 136 may separate the annular secondary inlet 140 into multiple annular inlet segments 140A, 140B, 140C, 140D, 140E, 140F, 140G, 140H. The annular inlet segments 140A, 140B, 140C, 140D, 140E, 140F, 140G, 140H are circumferentially aligned and extend around the housing 100. Each of the annular inlet segments 140A, 140B, 140C, 140D, 140E, 140F, 140G, 140H may be separated by a respective rib 136. There may be seven annular inlet segments 140A, 140B, 140C, 140D, 140E, 140F, 140G, 140H. In some embodiments, there may be two, three, four, five, six, eight, nine, ten, eleven, twelve, or more of the annular inlet segments, with a corresponding number of ribs 136 and/or other structures separating the annular inlet segments.

Figure 9:
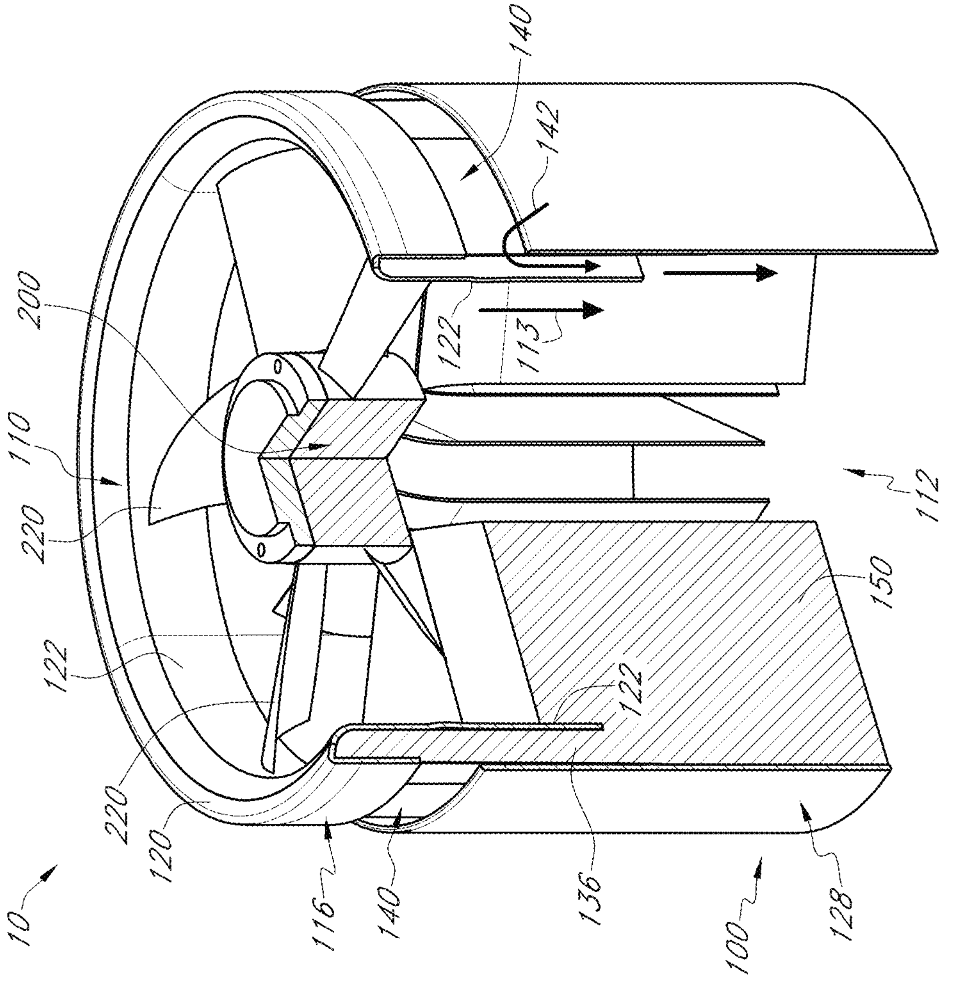
FIG. 9 is a partial cross-section view of the device of FIG. 1.

FIG. 9 is a partial cross-section view of the device 10. The device 10 includes all of the features as described herein with respect to FIGS. 1-8. For example, as shown, the device 10 includes the housing 100 including the lower portion 128 and the upper portion 116 with an annular secondary inlet 140. The primary inlet 110 is formed by the lip 120 and an upper region of the upper inner sidewall 122. The impeller assembly 200 rotates the impeller blades 220 to draw air through the primary inlet 110 and out the primary outlet 112. Air is drawn into the secondary inlet 140 and mixes with the air flowing inside the housing 100 and exits the primary outlet 112. The secondary flow path 142 may draw air radially inward through the secondary inlet 140 and down the flow path 142 on a radially outward side of the upper inner sidewall 122. The upper region 113 of the primary flow path 111 flows downward on a radially inward side of the upper inner sidewall 122. The two flow paths meet and the air flow may then mix below the upper inner sidewall 122. As shown, and as described herein, for example with respect to FIGS. 6A-6B, the rib 136 and the vane 150 may be one continuous part that extends to or near the bottom end of the housing 100, for example to the outlet 112. This configuration may facilitate axial or columnar flow produced by the device 10.

Figure 10A:
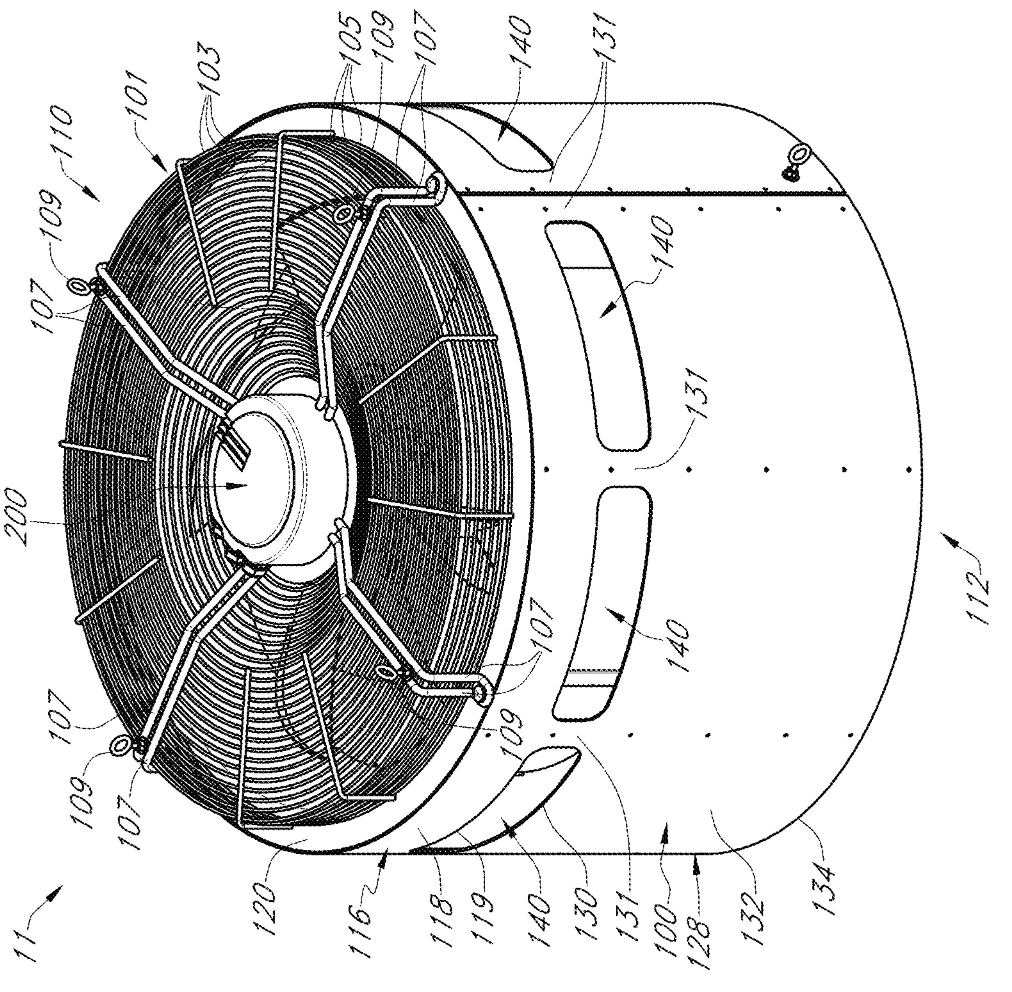
FIG. 10A is a perspective view of another embodiment of an air moving device having a bypass intake.
Figure 10B:
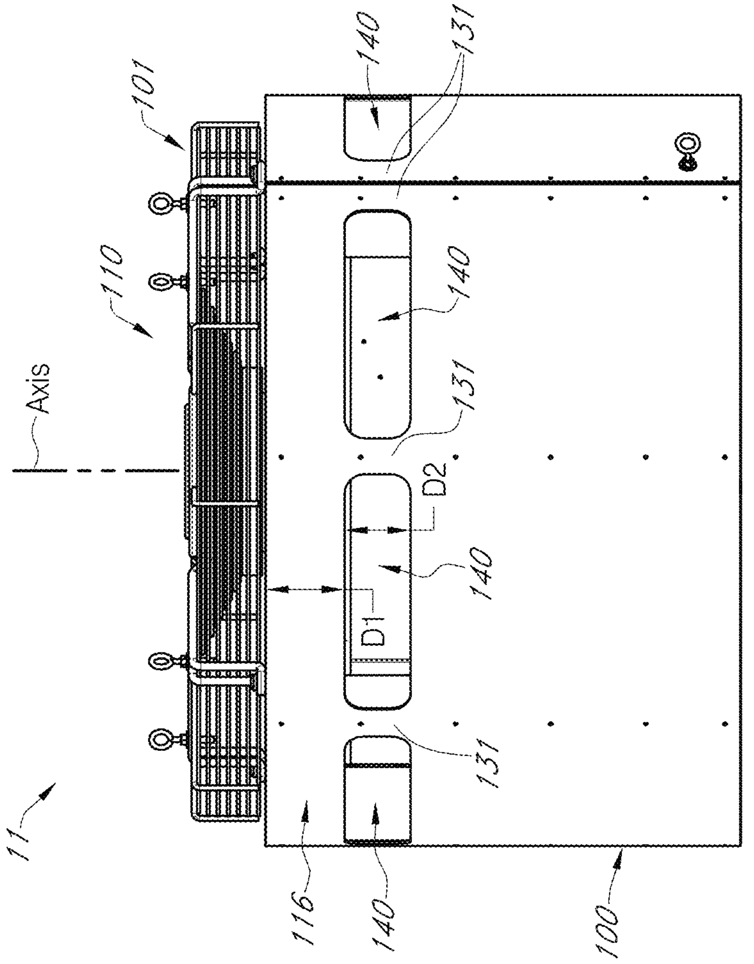
FIGS. 10B and 10C are respectively side and top views of the device of FIG. 10A.
Figure 10C:
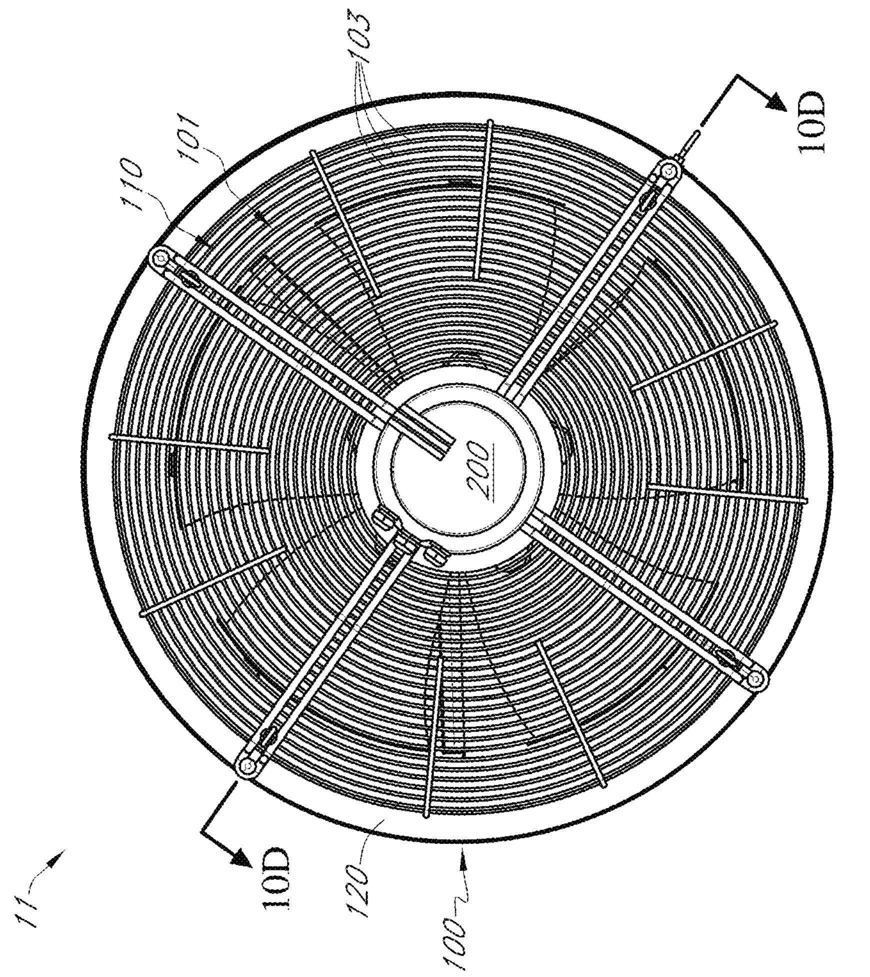
Figure 10D:
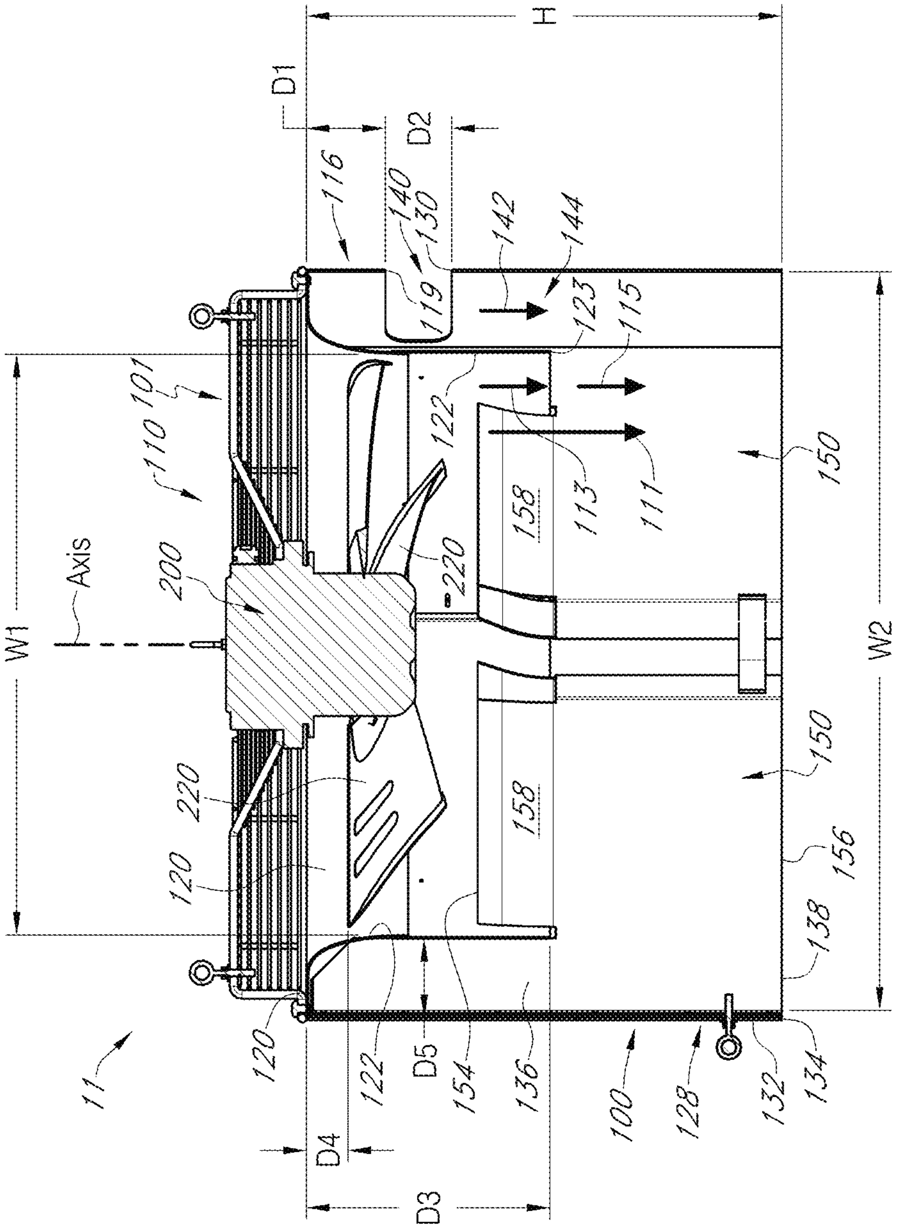
FIG. 10D is a cross-section view of the device of FIG. 10A as taken along the line 10D-10D indicated in FIG. 10C.

FIG. 10A is a perspective view of an air moving device 11 having a bypass intake. FIGS. 10B and 10C are respectively side and top views of the device 11. FIG. 10D is a cross-section view of the device 11 as taken along the line 10D-10D indicated in FIG. 10C. The device 11 may include the same or similar features as the device 10, and vice versa. Therefore, any description of the device 10 herein with respect to FIGS. 1-9 may apply to the device 11.

The device 11 includes the housing 100 including the lower portion 128 and the upper portion 116 with an annular secondary inlet 140. The primary inlet 110 is formed by the lip 120 and an upper region of the upper inner sidewall 122. The impeller assembly 200 rotates the impeller blades 220 to draw air through the primary inlet 110 along the primary flow path 111 and out the primary outlet 112. Air is drawn into the secondary inlet 140 along a secondary flow path 142 and mixes with the air flowing inside the housing 100 and exits the primary outlet 112.

The air moving device 11 also includes the grill 101. As shown, the embodiment of the grill 101 on the device 11 includes upper grill members 103 extending along a top surface of the grill 101 in an annular direction. The grill 101 also includes side grill members 105 extending along a side surface of the grill 101 in an annular direction. The members 103, 105 are spaced to allow air to be drawn into the primary inlet 110 and into the housing 100 by the impeller 200 rotating the blades 220.

The impeller 200 is desirably positioned and retained in place by supports 107. There may be eight supports 107 as shown, or fewer or greater than eight supports 107. The supports 107 may be part of the grill 101. In some embodiments, there may not be a grill 101 but only the supports 107 supporting the impeller 200. As shown, the grill 101 is attached to the supports 107 to support the impeller 200 and the grill members 103, 105 at a top region of the device 11. The impeller 200 extends axially downward from the supports 107 into the housing 100 such that the rotating blades 220 are located under the grill 101 and provide protection from injury to a user. The impeller 200 may be supported by a mount connecting the impeller 200 to the grill 100. Outer ends of the supports 107 connect to the housing 100, as shown to outer regions of the annular upper lip 120. Attachments 109 are located at an upper region of the device 11. As shown, the attachments 109 may be located on or near top outer ends of one or more of the supports 107. The attachments 09 may be eye hooks as shown, or other suitable mechanical features, for example for hanging the device 11 from a ceiling.

The device 11 further includes outer connecting ribs 131. The ribs 131 connect the upper portion 116 of the housing 100 to the lower portion 128 of the housing 100. As shown, the ribs 131 connect the upper outer sidewall 118 to the lower outer sidewall 132. The ribs 131 also define circumferential ends of the secondary annular inlets 140. The ribs 131 may be continuations of the upper portion and/or lower portion 128. The ribs 131 may be regions of the same continuous housing 100 structure.

The device 11 includes a plurality of the secondary annular inlets 140. The inlets 140 are separated by the ribs 131. There are eight inlets 140. There may be one, two, three, four, five, six, seven, nine, ten, eleven, twelve, thirteen, fourteen, fifteen, sixteen, seventeen, eighteen, nineteen, twenty, or more inlets 140. The inlets 140 may form windows leading to the secondary flow path 142. The outer connecting ribs 131 may be angularly aligned with the inner ribs 130. There may be one or more inner ribs 130 located radially inward of each outer connecting rib 131. In some embodiments, the inner and outer ribs 130, 131 may be one continuous structure. The inner rib 130 may have a thickness in the circumferential direction that is much smaller than the circumferential length of the outer rib 131, or these two dimensions may be the same or similar.

Importantly, the air moving device 11 may have a configuration as discussed above in connection with the air moving device 10. For example, the air moving device 11 may have a height H and an upper portion of the annular secondary inlet 140 may be located an axial distance D1 from the inlet 110. Similarly, the annular secondary inlet 140 may extend an axial height of distance D2. The distance D1 may be less than 50% of the height H. In some embodiments, the distance D1 may be less than 50%, 40%, 30%, 20%, 10% or less of the height H. The distance D2 may be greater than the distance D1. The distance D2 may be equal to the distance D1. In some embodiments, the distance D2 is greater than the distance D1 by 5%, 10%, 15%, 20%, 25% or more.

The air moving devices described herein, such as the devices 10 and 11, may be implemented with a variety of features and configurations that are still within the scope of this disclosure. For example, the housing 100, such as the upper and/or lower portions 116, 128 and/or other features of the housing 100, the impeller assembly 200, the ribs 136, and/or the vanes 150, may have other suitable shapes, configurations, features, etc., as shown and described in U.S. Pat. No. 7,381,129, titled "Columnar Air Moving Devices, Systems and Methods" and issued Jun. 3, 2008, in U.S. Pat. No. 9,631,627, titled "Columnar Air Moving Devices, Systems and Methods" and issued Apr. 25, 2017, in U.S. Pat. No. 8,616,842, titled "Columnar Air Moving Devices, Systems and Methods" and issued Dec. 31, 2013, in U.S. Pat. No. 10,221,861, titled "Columnar Air Moving Devices, Systems and Methods" and issued Mar. 5, 2019, in U.S. Pat. No. 9,151,295, titled "Columnar Air Moving Devices, Systems and Methods" and issued Oct. 6, 2015, in U.S. Pat. No. 9,459,020, titled "Columnar Air Moving Devices, Systems and Methods" and issued Oct. 4, 2016, in U.S. Pat. No. 9,335,061, titled "Columnar Air Moving Devices, Systems and Methods" and issued May 10, 2016, in U.S. Pat. No. 9,702,576, titled "Columnar Air Moving Devices, Systems and Methods" and issued Jul. 11, 2017, in U.S. Pat. No. 10,024,531, titled "Columnar Air Moving Devices, Systems and Methods" and issued Jul. 17, 2018, in U.S. Patent Publication No. 2016/0146222, titled "Air Moving Device" and Published May 26, 2016, and/or in U.S. Patent Publication No. 2017/0370363, titled "Air Moving Device" and Published Dec. 28, 2017, the entire content of each of which is incorporated herein by reference for all purposes and forms a part of this specification.

Various modifications to the implementations described in this disclosure will be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "example" is used exclusively herein to mean "serving as an example, instance, or illustration." Any implementation described herein as "example" is not necessarily to be construed as preferred or advantageous over other implementations, unless otherwise stated.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Additionally, other implementations are within the scope of the following claims. In some cases, the actions recited in the claims can be performed in a different order and still achieve desirable results.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. An air moving device for an enclosed structure, comprising:

a housing extending axially from a primary inlet to a primary outlet and defining a primary flow path from the primary inlet to the primary outlet, the housing defining an upper outer sidewall and a lower outer sidewall and an upper inner sidewall spaced radially inward from the upper outer sidewall, the upper inner sidewall defining a lower edge located axially closer to the primary outlet than the primary inlet is located from the primary outlet;

an impeller assembly coupled with the housing and configured to rotate a blade to cause air to enter the housing through the primary inlet, flow along the primary flow path, and exit the housing through the primary outlet;

a secondary flow path extending from a secondary inlet to an inner outlet positioned between the lower outer sidewall and the upper inner sidewall, the secondary inlet defined by the lower outer sidewall of the housing and located axially closer to the primary outlet of the housing than the primary inlet of the housing is located to the primary outlet of the housing and the inner outlet located such that air exiting the secondary flow path joins the secondary flow path, wherein a portion of the secondary flow path extends between an inner surface of the lower outer sidewall and the upper inner sidewall; and the upper inner sidewall extending along an inner side of the secondary flow path to the lower edge of the upper inner sidewall, wherein the primary inlet is located an axial distance D1 from an upper edge of the secondary inlet, the secondary inlet extends an axial distance D2 from the upper edge of the secondary inlet, the lower edge of the upper inner sidewall is located an axial distance D3 from the primary inlet, an upper-most portion of the blade is located an axial distance D4 from the primary inlet and the secondary flow path has a radial width of distance D5 and wherein further D4 is greater than or equal to 1 inch, D1 is greater than D4 and D5 is greater than or equal to 0.25 inches.

2. The air moving device of claim 1, wherein an upper region of the primary flow path located closer to the primary inlet than to the primary outlet has a first cross-sectional area, a lower region of the primary flow path located closer to the primary outlet than to the primary inlet has a second cross-sectional area, and the first cross-sectional area is less than the second cross-sectional area.

3. The air moving device of claim 1, wherein an upper region of the primary flow path located closer to the primary inlet than to the primary outlet defines a first diameter, a lower region of the primary flow path located closer to the primary outlet than to the primary inlet defines a second diameter, and the first diameter is less than the second diameter.

4. The air moving device of claim 1, further comprising a plurality of longitudinal stator vanes extending within the primary flow path.

5. The air moving device of claim 4, further comprising a plurality of longitudinal ribs extending within the secondary flow path.

6. The air moving device of claim 5, wherein D4 is greater than or equal to 2.0 inches.

7. The air moving device of claim 4, wherein D3 is greater than or equal D1 plus D2.

8. The air moving device of claim 7, wherein D4 is greater than or equal to 1.5 inches.

9. The air moving device of claim 1, wherein the primary inlet is located an axial height H from the primary outlet, the primary inlet has a radial opening equal to a width W1, and wherein His at least 75% of W1.

10. The air moving device of claim 9, wherein H is greater than or equal to W1.

11. The air moving device of claim 9, wherein H is greater than 1.25×W1.

12. The air moving device of claim 1, further comprising a plurality of longitudinal stator vanes extending within the primary flow path and that are radially aligned with a plurality of longitudinal ribs.

13. The air moving device of claim 12, wherein the plurality of longitudinal stator vanes, the plurality of longitudinal ribs, and the housing, are integral.

14. The air moving device of claim 13, wherein the primary inlet is located an axial height H from the primary outlet, the primary inlet has a radial opening equal to a width W1, and wherein His at least 75% of W1.

15. The air moving device of claim 14, wherein H is greater than 1.25×W1.

* * * * *